United States Patent
Husain

(10) Patent No.: US 12,283,836 B2
(45) Date of Patent: *Apr. 22, 2025

(54) SYSTEMS AND METHODS OF APPLYING ARTIFICIAL INTELLIGENCE TO BATTERY TECHNOLOGY

(71) Applicant: SparkCognition, Inc., Austin, TX (US)

(72) Inventor: Syed Mohammad Amir Husain, Georgetown, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,871

(22) Filed: Apr. 19, 2024

(65) Prior Publication Data

US 2024/0266856 A1    Aug. 8, 2024

Related U.S. Application Data

(63) Continuation of application No. 16/999,980, filed on Aug. 21, 2020, now Pat. No. 11,967,850.

(60) Provisional application No. 62/889,979, filed on Aug. 21, 2019.

(51) Int. Cl.
| | | |
|---|---|---|
| *H02J 7/00* | (2006.01) |
| *G06N 3/084* | (2023.01) |
| *G06N 3/086* | (2023.01) |
| *H02J 7/14* | (2006.01) |
| *H02J 7/24* | (2006.01) |

(52) U.S. Cl.
CPC ............ *H02J 7/007* (2013.01); *G06N 3/084* (2013.01); *G06N 3/086* (2013.01); *H02J 7/1423* (2013.01); *H02J 7/24* (2013.01)

(58) Field of Classification Search
CPC ....................................................... H02J 7/007
USPC ......................................................... 320/137
See application file for complete search history.

(56) References Cited

U.S. PATENT DOCUMENTS

| | | | |
|---|---|---|---|
| 7,761,389 B2 | 7/2010 | Medasani et al. | |
| 7,872,444 B2 | 1/2011 | Hamilton et al. | |
| 10,197,631 B2 | 2/2019 | Barfield, Jr. et al. | |
| 2016/0195587 A1* | 7/2016 | Lee | G01R 31/392 702/63 |
| 2016/0349330 A1* | 12/2016 | Barfield, Jr. | G01R 31/389 |
| 2016/0363632 A1* | 12/2016 | Park | G01R 31/3648 |
| 2019/0227528 A1 | 7/2019 | Abbott et al. | |

(Continued)

FOREIGN PATENT DOCUMENTS

CN    103336877 B    3/2016

OTHER PUBLICATIONS

Murphey, Yi L., "Intelligent Hybrid Vehicle Power Control—Part I: Machine Learning of Optimal Vehicle Power," Computer Science, IEEE Transactions on Vehicular Technology, 2012, DOI: 10.1109/TVT.2012.2206064, pp. 1-24.

*Primary Examiner* — Yalkew Fantu
(74) *Attorney, Agent, or Firm* — Moore IP Law

(57) ABSTRACT

Uses of artificial intelligence in battery technology including a method that includes receiving input data associated with at least one sensor. The method includes executing at least one trained model by a processor. Executing the trained model comprises providing the input data to the at least one trained model to generate a model output. The method further includes determining, based on the model output, whether to initiate or terminate selectively charging a first battery cell of a battery.

20 Claims, 13 Drawing Sheets

(56) References Cited

U.S. PATENT DOCUMENTS

2020/0203956 A1\* 6/2020 Chiu .................. H01M 10/054
2020/0223422 A1\* 7/2020 Ye ......................... B60K 6/485

\* cited by examiner

Input set of 200 models at start of epoch N

700

750

Evaluate model fitness and cluster models into species based on genetic distance

760

Determine species fitness, identify "elite species," and remove stagnant species Identify "elite members" of "elite species" as well as "overall elites"

SYSTEMS AND METHODS OF APPLYING ARTIFICIAL INTELLIGENCE TO BATTERY TECHNOLOGY

CROSS-REFERENCE TO RELATED APPLICATION

The present application claims priority from U.S. application Ser. No. 16/999,980 filed Aug. 21, 2020, entitled "SYSTEMS AND METHODS OF APPLYING ARTIFICIAL INTELLIGENCE TO BATTERY TECHNOLOGY," which claims priority from U.S. Provisional Application No. 62/889,979 filed Aug. 21, 2019, entitled "SYSTEMS AND METHODS OF APPLYING ARTIFICIAL INTELLIGENCE TO BATTERY TECHNOLOGY," which are incorporated by reference herein in their entirety.

BACKGROUND

Batteries are an important, though sometimes taken-for-granted, aspect of modern technology. Several factors have increased the importance of batteries. For example, battery technology is considered an environmentally friendly alternative to fossil fuel technology, especially in the areas of vehicle propulsion and utility grids. As another example, electronic devices are becoming smaller and more mobile, while consumers continue to expect high performance and connectivity from such devices as they operate on batteries.

SUMMARY

Uses of artificial intelligence in battery technology are described. Various aspects are described herein with respect to "batteries," "battery packs," or "battery cells" (also referred to as "cells"). As used herein, a battery may be a single-cell battery or a multi-cell battery. A cell may generally refer to a combination structure that includes, for example, a pair of electrodes (e.g., anode and cathode) and an electrolyte. A battery that has multiple cells may also be referred to as a battery pack.

In accordance with an aspect of the present disclosure, sensor data is collected from within and around batteries (and/or individual battery cells thereof) as they operate in various environments. The collected data may reflect battery performance as well as environmental conditions. The collected data may be used to train machine learning models to predict future battery performance and future battery failure. The collected data may also be used for automated rule development, such as for rules regarding charging cycles for batteries. A charge controller may execute the model or a rules engine using the rules to determine when, for how long, and at what level (e.g., current draw/voltage level) to charge a battery or cell thereof. Output from executing such a model or rules engine may be provided as input to battery design teams and maintenance staff. In the case of vehicle batteries, a model or rule set may be generically applicable to multiple vehicles, may be specific to a particular type of vehicle, may be specific to particular environmental conditions or geographic regions, may be specific to a single vehicle, etc.

Although certain aspects may be described herein in terms of battery operation for ground-based vehicles (e.g., cars), it is to be understood that the techniques of the present disclosure may be applicable to other types of vehicles, such as electric vertical takeoff and landing (EVTOL) aircraft, watercraft, etc. The techniques of the present disclosure may also be applied to improve battery charging/discharging performance in non-vehicle scenarios, for example in the case of a battery-based electrical grid.

In accordance with another aspect, multiple battery cells are combined in a larger battery pack, for example to be used in an electric or hybrid vehicle, aerial vehicle, utility grid, etc. In such cases, the battery cells may be arranged and connected in a switchable battery fabric. To illustrate, the connection framework for the battery cells may enable the cells to be individually selected for charging, discharging, connection, and/or disconnection on a predictive basis, based on execution of trained models.

In yet another aspect, a switching controller and signaling protocol are disclosed to enable providing power and control data on a single input. To illustrate, each battery or cell in the switchable battery fabric may be coupled to a controller that receives an alternating current (AC) or a direct current (DC) power supply signal and control data on the same input. The control data may include commands directed to specific batteries/cells, such as commands to begin charging, stop charging, connect into the discharge path, disconnect from the fabric altogether, etc. Individual batteries/cells may be addressed by a unique identifier that is encoded in the command.

DETAILED DESCRIPTION

Figure 1:
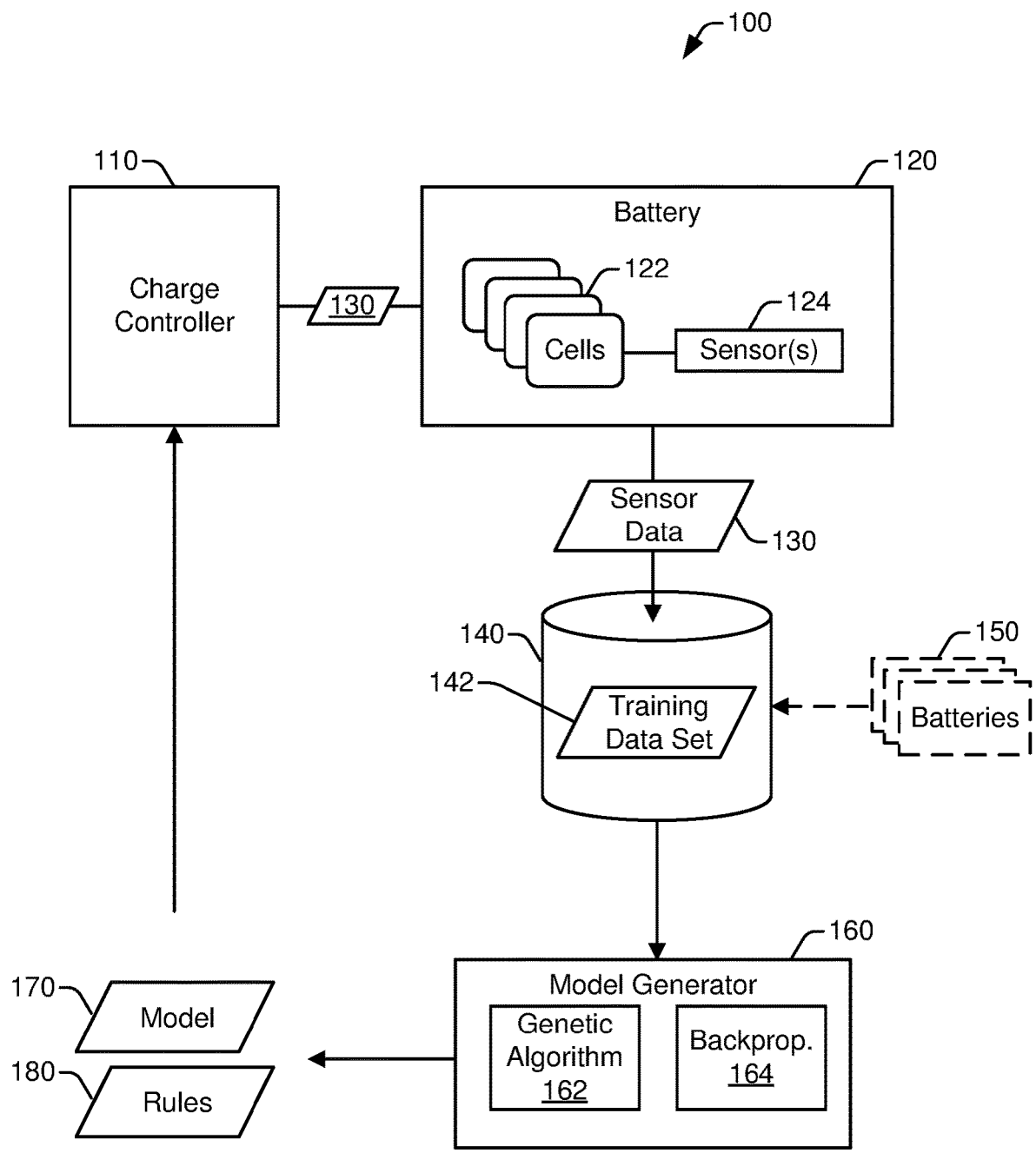
FIG. 1 illustrates a particular embodiment of a system that is generally operable to apply artificial intelligence principles to battery technology.

Particular aspects of the present disclosure are described below with reference to the drawings. In the description, common features are designated by common reference numbers throughout the drawings. As used herein, various terminology describing particular implementations is not intended to be limiting. For example, the singular forms "a,"

"an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 illustrates a particular embodiment of a system 100 that is generally operable to apply artificial intelligence and machine learning principles to battery technology. The system 100 includes a charge controller 110 coupled to a battery 120. In the illustrated example, the battery 120 is a battery pack that includes multiple battery cells 122, though in alternative examples the battery 120 may be a single-cell battery. The battery 120 may generally be any type of battery. Examples of battery types include, but are not limited to, rechargeable, non-rechargeable, lead acid, alkaline, nickel-metal hydride (NiMH), lithium ion, nickel cadmium (NiCd), etc.

FIG. 1 further illustrates one or more sensors 124 coupled to the cells 122. In various embodiments, sensors 124 may be coupled to individual cells, collectively coupled to multiple cells, may be present within the battery 120, may be placed external to the battery 120, etc. The sensors 124 may collectively generate sensor data 130 that reflects various operational and environmental characteristics associated with the battery 120. Examples of sensor types include, but are not limited to, temperature, vibration, voltage, current, acceleration, motion, state of charge, etc. Certain sensors 124 may provide sensor data 130 related to a larger device that is coupled to or otherwise associated with the battery 120. For example, if the battery 120 is associated with an electric or hybrid automobile, the sensors 124 may include automotive sensors that measure properties associated with tire rotation, engine operation, thrust, braking, coolant levels, air flow, manifold pressure, oxygen level, fuel, exhaust, passenger/cargo load, environmental (e.g., weather) conditions, etc.

The sensor data 130 may be stored at a storage device 140. A training data set 142 may be formed based on the sensor data 130, and, optionally, sensor data from other sensor(s) associated with one or more other batteries 150. To illustrate, the training data set 142 may be formed based on sensor data received from sensors that measure characteristics of similar batteries, similar types of batteries, similar operating environments, etc. As an example, the training data set 142 may be formed based on sensor data for vehicle batteries in the same make/model of vehicle. It is to be understood that the data storage device 140 may be located near the battery 120 (e.g., in the same car as the battery 120) or may be located remotely and accessible via network communication.

A model generator 160 may generate a model 170 based on the training data set 142. In the illustrated example, the model 170 is generated based on execution of a neuroevolutionary process (e.g., a genetic algorithm 162) and optimization training (e.g., backpropagation 164), though it is to be understood that different model generation techniques may be used in other examples. The model generator 160 may in some cases correspond to hardware circuitry, software instructions, or a combination thereof. For example, the model generator 160 may be software application executed by a computing device, an Internet-accessible cloud service, etc. Particular aspects of model generation are further described with reference to FIGS. 5-11.

The model 170 may be provided to (e.g., downloaded to) the charge controller 110 or to processor(s) coupled to the charge controller 110 that execute the model 170 to dynamically determine charging conditions for the battery 120. For example, the charge controller 110 or processor(s) may receive sensor data 130 from the battery 120 and may input the sensor data 130 into the model 170 to generate model output. The model output may influence operation of the charge controller 110. To illustrate, the model output may indicate when to begin charging the battery 120 or a cell 122, when to stop charging the battery 120 or the cell 122, at what level (e.g., charging voltage or current draw) to charge the battery 120 or the cell 122, etc.

In some examples, the model output may also predict future battery performance and/or future battery failure. To illustrate, the training data set 142 may include labeled sensor data 130 corresponding to time periods that preceded battery failure (or cell failure), and the model 170 may thus be trained using supervised learning as a model configured to output a prediction of an impending failure when sufficiently similar sensor data is measured by the sensors 124 and input into the model 170.

In yet another example, model output may predict or indicate "optimality," e.g., whether the battery 120 or a cell 122 thereof is functioning as it should or is expected to according to battery/cell specifications. In some cases, optimality may be considered in view of environmental factors, such as how ambient temperature and humidity conditions affect battery charging/discharging. By training the model 170 using historical sensor data that was collected over a period of time, the model 170 may reflect battery performance over time under certain conditions in certain environments, and model output may thus be used to determine improved battery charging and/or usage parameters that take performance over time into account.

In some examples, the training data set 142 may be used to generate rules 180. To illustrate, if the training data set 142 indicates that the battery 120 is often exposed to high temperatures (e.g., over ninety degrees Fahrenheit), the rules 180 may indicate that the battery 120 is to be charged using a lower-than-normal charging voltage. As another example, if the training data set 142 indicates that the battery 120 is often exposed to low temperatures (e.g., under zero degrees Fahrenheit), the rules 180 may indicate that the battery is to be charged using a higher-than-normal charging voltage. As yet another example, the rules 180 may indicate that the charging voltage for the battery 120 is to be dynamically determined based on ambient temperature, and may optionally indicate a specific charging voltage decrease/increase per degree increase/decrease in ambient temperature. Additional examples of the rules 180 include rules regarding whether to activate selective charge routing, selective temperature monitoring, etc.

The model 170 and the rules 180 may thus represent an example of using environmental data (and/or other relevant data) and machine learning to improve battery performance. In some aspects, machine learning models may be trained using historical performance/health data in addition to environmental data to predict recommended charging and discharging conditions for a battery or cell thereof. In a particular aspect, a trained model may be used to suggest battery maintenance operations or provide other in-use reports. In yet another aspect, a trained model may be used to suggest battery, load, or charging features for a particular use case and/or environment. To illustrate, a different model 170 may be used depending on heat patterns, climate, vehicle usage patterns, passenger load patterns, etc. Thus, in some cases, different models may be used for city driving vs. freeway driving, for summer vs. winter, for driver-only trips vs. entire-family trips, etc.). Putting machine learning functionality into (e.g., the charge controller 110 of) a device, for example a vehicle, may enable updates to improve/tune a model to a specific vehicle/battery pair. If a battery moves from one load to another, machine learning functionality may move with the battery and adapt to the new load if/when needed. In some examples, machine learning output may be provided to battery design teams, maintenance staff, etc., for example for use in configuring operating temperature ranges, battery position within a device/vehicle with respect to other items (e.g., insulation, heat sink, active cooling), etc.

The system 100 of FIG. 1 may also enable an "online" aspect to battery operation. To illustrate, various electronic devices, vehicles, etc. may upload sensor data to a server or cloud-accessible service. The server/service may use such sensor data, in individual and/or aggregate form, to generate and deploy customized machine learning solutions, which may be downloaded back to the devices, vehicles, etc. As conditions change, model updates may be provided so that the various devices, vehicles, etc. experience improved battery charging/discharging performance.

Figure 2:
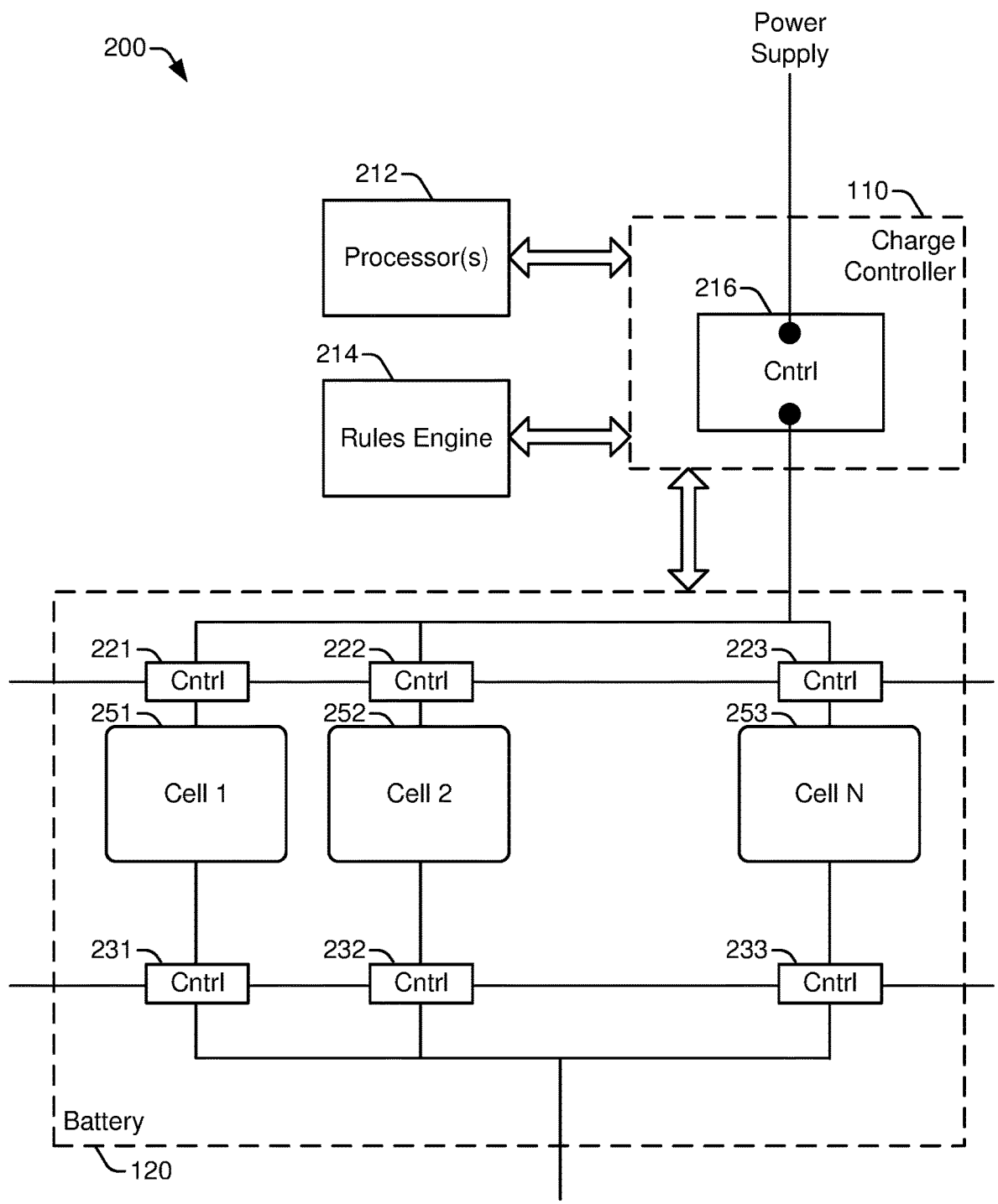
FIG. 2 illustrates another particular embodiment of a system that is generally operable to apply artificial intelligence principles to battery technology.

FIG. 2 illustrates another embodiment of a system 200 that includes the charge controller 110 and the battery 120. The charge controller 110 is coupled to one or more processors 212 and a rules engine 214. In alternate implementations the processors 212 and/or the rules engine 214 may be a part of the charge controller 110. In some aspects, the processors 212 provide input (e.g., the sensor data 130) to a machine learning model (e.g., the model 170), to generate model output. The rules engine 214 may operate based on rules (e.g., the rules 180) to determine aspects of battery charging/discharging, as described with reference to FIG. 1. The charge controller 110 includes a control circuit 216 that selectively connects a power supply signal (or modified version thereof, as further described herein), to the battery 120.

In the example of FIG. 2, the battery 120 is a multi-cell battery, where each cell is designated by a number, e.g., "Cell 0" 251, "Cell 1" 252, . . . "Cell N" 253. Each cell may be coupled to one or more control circuits (e.g., control circuits 221, 222, 223, 231, 232, 233) that switch the cells in and out of a charging path and/or a discharging path. In some examples, control circuits may enable connecting cells in series in a discharge path to provide a higher-voltage power source.

In some examples, output from the processors 212 and/or the rules engine 214 may be used to determine operation at the various control circuits 216, 221-223, 231-233. For example, the control circuit 216 may selectively couple the power supply to the battery 120 based on whether model/rules engine output indicates that charging is recommended. In some examples, output that is generated by executing a trained prediction model and/or a rules engine may result in selectively charging or discharging some cells but not other cells, or at least charging or discharging some cells before charging or discharging other cells. Factors that may lead to such output at the trained prediction model or rules engine may include, but are not limited to, a cell having a higher possibility of overheating/thermal runaway than another cell, a cell being predicted to have less capacity than another cell, etc. In another example, charging or discharging of "healthier" cells may be prioritized, where "health" is determined based on capacity, state of charge, charging time, discharging time, idle/self discharging time, leakage, internal resistance, age, temperature, predicated likelihood of failure, one or more other characteristics or metrics, or any combination thereof. In some examples, the control circuit 216 may convert the power supply (e.g., in terms of voltage, alternating vs. direct current, etc.) and provide a converted supply to the battery 120. In yet another example, the control circuit 216 may use inductive coupling between one or more inductor pairs to selectively adjust a magnitude (e.g., in voltage or amperes) of the charging supply provided to the battery 120, such as based on ambient temperature, as described with reference to FIG. 1.

Although one multi-cell battery 120 is shown in FIG. 1, it is to be understood that any number of single-cell and/or multi-cell batteries may be present in the system 200. In some cases, each battery has a corresponding charge controller. In other cases, a single charge controller is provided for multiple batteries. In some cases, a charge controller is provided for each cell within each battery, and in such cases the charge controllers may reside within the batteries. Further, although illustrated as block "control circuits" for ease of explanation, it is to be understood that the control circuits shown in FIG. 2 may include various constituent electrical components depending on implementations, such as resistors, capacitors, transistors/switches, inductors, etc. The specific wiring of the control circuits may be determined based on the use case and environment of the battery. To illustrate, different control circuits may be used depending on how many cells can be simultaneously charged, whether and how many are to be simultaneously discharged to provide sufficient voltage for device operation, etc.

The cell-specific control circuits 221-223, 231-233 may be controlled based on output from the processors 212 and/or the rules engine 214. For example, an individual cell 251-253 may be put into one of three different states based on output from the processors 212 and/or the rules engine 214. As an example, the first cell 251 may be connected into a charging path while being disconnected from a discharging path, the second cell 252 may be disconnected from both the charging path and the discharging path (e.g., may be in an "idle"/"unused") state, and the third cell 253 may be disconnected from the charging path while being connected to the discharging path.

Thus, the system of FIG. 2 represents a "switchable battery fabric" that enables individual batteries, or cells thereof, to be charged and discharged based on output from a machine learning model or a rules engine. Such granular operation may provide various benefits. To illustrate, a cell that is predicted to fail may be electrically isolated from other cells, thereby reducing the chances of the failed cell adversely impacting operation of other cells and/or the battery as a whole. As another example, a battery can be built with more cells than needed for a given load, so that some cells can be charged and made ready while other cells are discharging, thereby providing for a more robust, relatively uninterrupted power supply. The system of FIG. 2 thus enables "multiplexing" of batteries in and out of various electrical paths on a predictive basis based on operation of artificial intelligence (e.g., machine learning) algorithms.

Figure 3:
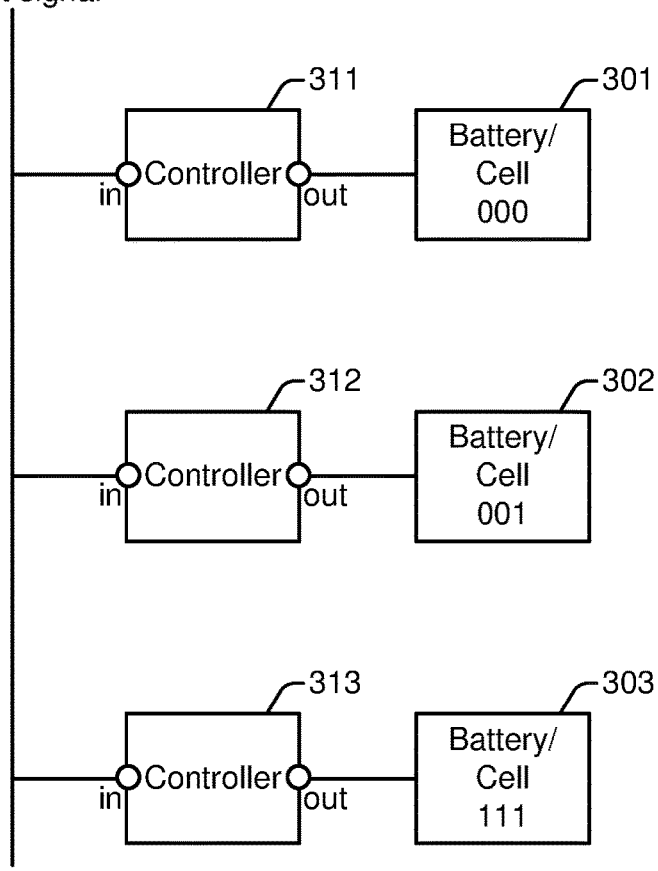
FIG. 3 illustrates another particular embodiment of a system that is generally operable to apply artificial intelligence principles to battery technology.

In some cases, to accomplish selective "multiplexing" of batteries/cells in and out of charging/discharging paths, an array of switches may be used. However, each switch may increase overall cost of the power subsystem within a vehicle, grid, etc. In accordance with another aspect of the present disclosure, each battery or cell thereof is connected to a "smart" controller, and a combined power and control signal is provided to each such controller. For example, referring to FIG. 3, three batteries/cells 301, 302, 303 have respective identifiers (IDs) 000, 001, and 111, and each battery/cell is connected to a corresponding controller 311, 312, 313. The controllers 311-313 are connected via a common bus, on which a combined power and control input 320 is provided. Although the terminology of a "signal" is used and a single "wire" is shown in FIG. 3, it is to be understood that depending on implementation, the combined power/control input may be provided over any number of conductors. Examples of combined power/data communication include Power over Ethernet, Powerline, etc. In an illustrative example, power and control data are transferred on the same conductor(s) at different frequencies. To illustrate, an AC power signal may have a frequency of 50 hertz (Hz) or 60 Hz, whereas control data may be sent at a much higher frequency, for example between 2 and 88 megahertz (MHz) in powerline-type systems. In a power-over-ethernet-type system, a power signal may be "injected" onto one or more pairs of conductors of a cable/wire, where such conductors may also be carrying data signals or may be different from the conductors dedicated for data signal communication. In a combined DC power and data signal, the data may be modulated onto a high-frequency carrier signal that is communicated on the same line(s) that carry the DC power. The frequency of the carrier signal may be selected based on system characteristics, interference patterns, etc.

At the physical (PHY) and media access control (MAC) layers, data communication may be associated with various parameters, the values of which may be based on what specific set of protocols is in use. Examples of such parameters may include, but are not limited to, one or more of forward error correction (FEC) coding, number of carriers, modulation scheme, interleaver parameters, sampling frequency, symbol duration, intercarrier spacing, guard interval duration, transform size (e.g., Fourier transform (FFT)/inverse FFT (IFFT) size), frame/block size, etc. Depending on implementation, communication in the system of FIG. 3 may be unidirectional, half-duplex, or full-duplex.

A signaling protocol may be used to enable individually addressing each of the batteries/cells 301-303 in the switchable battery fabric via their corresponding controllers 311-313. An illustrative non-limiting example of such a protocol is shown at the top of FIG. 3. In the example shown, command data directed to a specific battery or cells begins with a start flag (e.g., 10010) and ends with an end flag (e.g., 01001). The command data includes the ID of the addressed battery (e.g., "000" for battery 301, "001" for the battery 302, or "111" for the battery 303). The command data also includes one or more commands. Examples of commands include commands to connect the identified battery/cell to a specific charging path, set a charging signal magnitude (e.g., in volts or amps) for the identified battery/cell to a particular value, disconnect the identified battery/cell from a specific charging path, connect the identified battery/cell to a specific discharge path (or load), disconnect the identified battery/cell from a specific discharge path (or load), etc.

It is to be understood that the architecture and protocol illustrated in FIG. 3 are merely exemplary and are not to be considered limiting. Alternative implementations may include different architectures and/or protocols.

During operation, each of the controllers 311-313 (which in some cases may be implemented using an electrical switch and comparator circuitry) monitors the combined input 320. When a controller observes its own ID (e.g., the associated battery/cell's ID), the controller executes the provided commands, such as to begin, adjust, or terminate charging or discharging of its associated battery/cell. Notably, such operations may be performed predictively based on operation of machine learning models and rules engines, as described with reference to FIG. 1.

In some aspects, a controller may also communicate information regarding its battery/cell (e.g., temperature metrics, leak detection, and/or other sensor data as described with reference to FIG. 1) back upstream for monitoring and/or use in determining what commands to communicate to what batteries/cells in the future. Similarly, battery/cell specifications may be stored by and communicated upstream by the controller. The controller may also communicate information regarding whether a battery or cell is operating within the bounds of such specifications.

The system of FIG. 3 thus illustrates a device that receives combined control data and power on the same input terminal (designated "in" in FIG. 3). Based on whether the control data includes a particular identifier of a corresponding battery/cell, control circuitry of the device may selectively connect the input terminal to an output terminal (designated "o" in FIG. 3), which may result in charging the corresponding battery/cell. Use of such devices for battery management in a switchable battery fabric may be simpler and/or less expensive than using complex M×N switches.

Figure 4A:
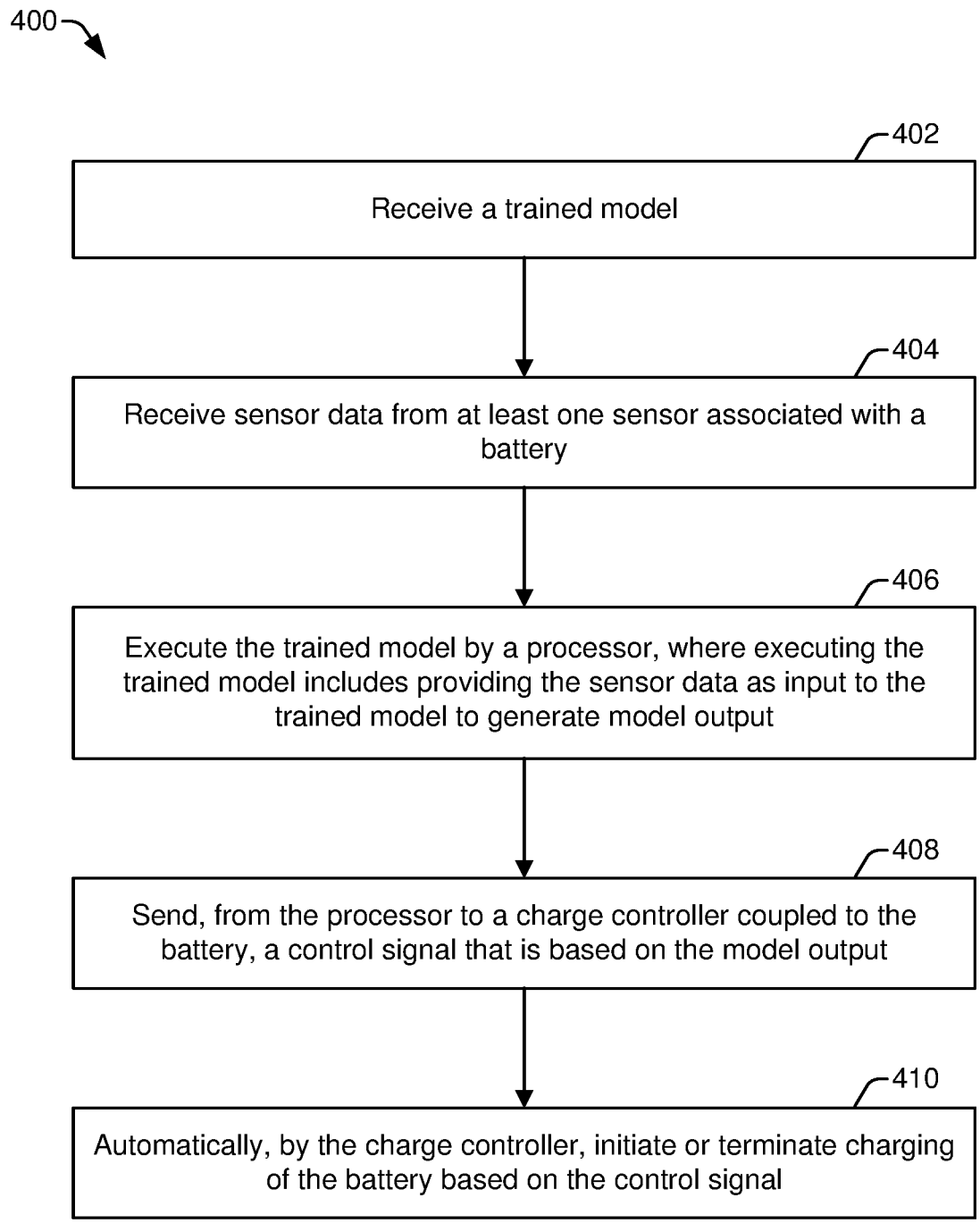
FIGS. 4A and 4B illustrate particular embodiments of methods of operation in accordance with the present disclosure.

FIG. 4A illustrates a flowchart of a particular example of a method 400 of using a trained model to control battery charging. The method 400 may correspond to operations performed at the systems of FIGS. 1, 2, and/or 3.

The method 400 includes receiving a trained model, at 402, and receiving sensor data from at least one sensor associated with a battery, at 404. For example, the charge controller 110 and/or the processor(s) 212 may receive the model 170 and the sensor data 130.

The method 400 also includes executing, by a processor, the trained model, at 406. Executing the trained model includes providing the sensor data as input to the trained model to generate a model output. For example, the processor(s) 212 may provide the sensor data 130 to the model 170 to generate a model output.

The method 400 further includes sending, from the processor to a charge controller coupled to the battery, a control signal that is based on the model output, at 408. For example, the processors 212 may send a control signal to the charge controller 110. In a particular example, the control signal may include data represented in accordance with the addressing protocol described with reference to FIG. 3. Alternatively, or in addition, the control signal may be communicated as part of a combined power and control signal, as described with reference to FIG. 3.

The method 400 includes automatically, by the charge controller, initiating or terminating charging of the battery based on the control signal, at 410. For example, the charge controller 110 may control operation of one or more of the control circuits shown in FIG. 2 or FIG. 3 to initiate or terminate charging of a particular battery (or cell).

Figure 4B:
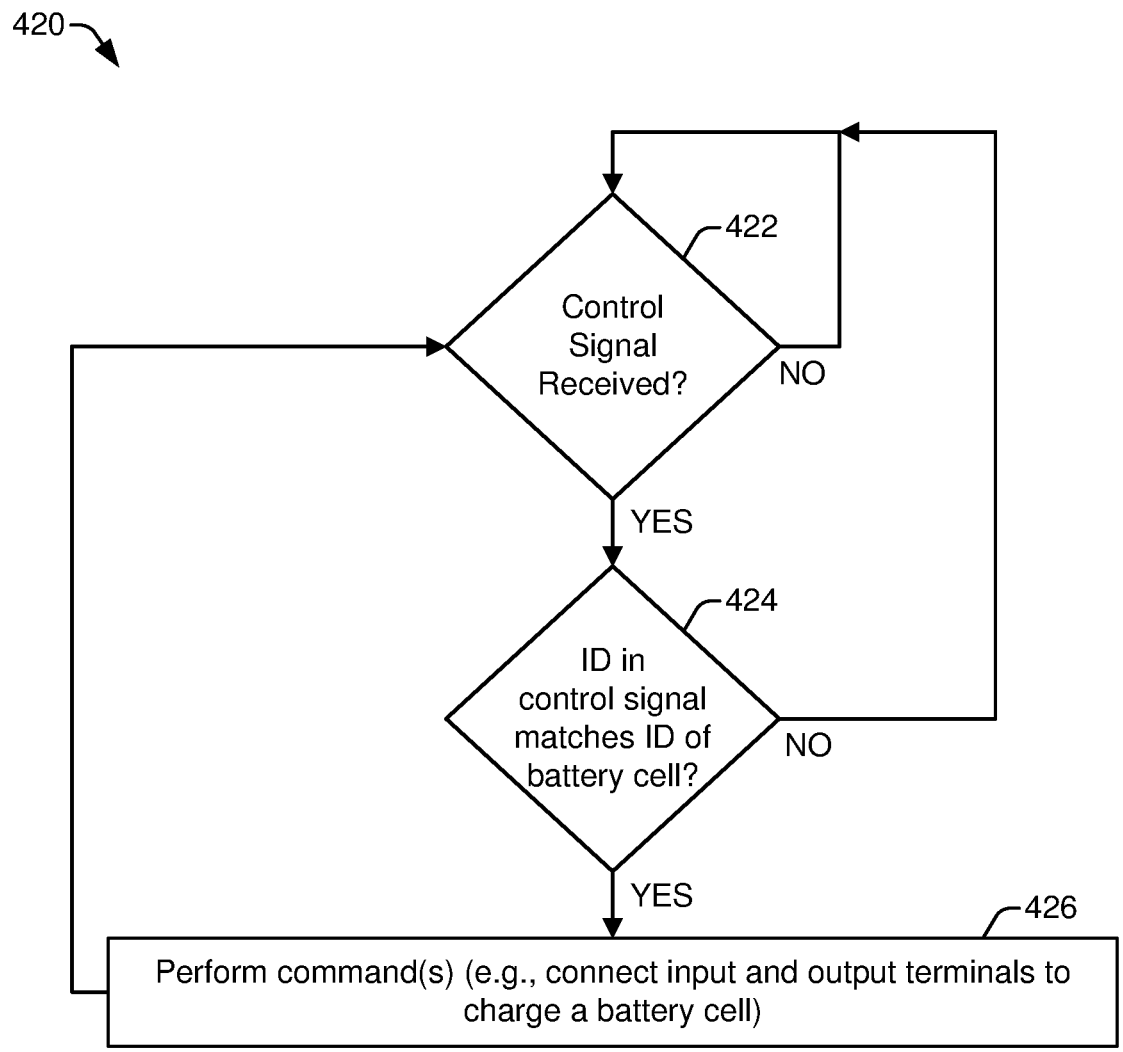

FIG. 4B illustrates a flowchart of a particular example of a method 420 of operation at a device that receives combined power and control at an input terminal. The method 420 may correspond to operations performed at the systems of FIGS. 1, 2, and/or 3.

The method 402 remains at 422 until a control signal is received at the input terminal. When a control signal is received, the method 420 continues to 424. At 424, the method 420 includes determining whether an identifier (ID) in the control signal matches an ID of a particular cell. If not, the method 420 returns to 422 (and the previously received control signal is disregarded). Although FIG. 4B illustrates a method of operation at control circuitry for a particular battery cell, it is to be understood that the same method may concurrently be executed by multiple sets of control circuitry corresponding to multiple other cells, where each such control circuitry compares ID(s) in the control signal to the ID(s) of the battery cells coupled to that control circuitry.

If the IDs match, the method 420 includes performing the command(s) indicated in the control data, at 426, and the method 420 then returns to 422. As an example, the method 420 may include connecting the input terminal to an output terminal so that the power signal being received at the input terminal is provided to the cell to charge the cell. Various commands may be included in the control data. Examples of commands include commands to connect the identified cell to a specific charging path, set a charging signal magnitude (e.g., in volts or amps) for the identified cell to a particular value, disconnect the identified cell from a specific charging path, connect the identified cell to a specific discharge path (or load), disconnect the identified cell from a specific discharge path (or load), etc.

Various functionality described herein is associated with training and/or using trained models. FIGS. 5-11 illustrate particular examples of a system 500 that is operable to build such models, and the operation of such a system 500.

The system 500, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 500 includes a genetic algorithm 510 (e.g., the genetic algorithm 162 of FIG. 1) and a backpropagation trainer 580 (e.g., the backpropagation 164 of FIG. 1). The backpropagation trainer 580 is an example of an optimization trainer, and other examples of optimization trainers that may be used in conjunction with the described techniques include, but are not limited to, a derivative free optimizer (DFO), an extreme learning machine (ELM), etc. The combination of the genetic algorithm 510 and an optimization trainer, such as the backpropagation trainer 580, may be referred to herein as an "automated model building (AMB) engine." In some examples, the AMB engine may include or execute the genetic algorithm 510 but not the backpropagation trainer 580, for example in the case of certain reinforcement learning problems.

Figure 5:
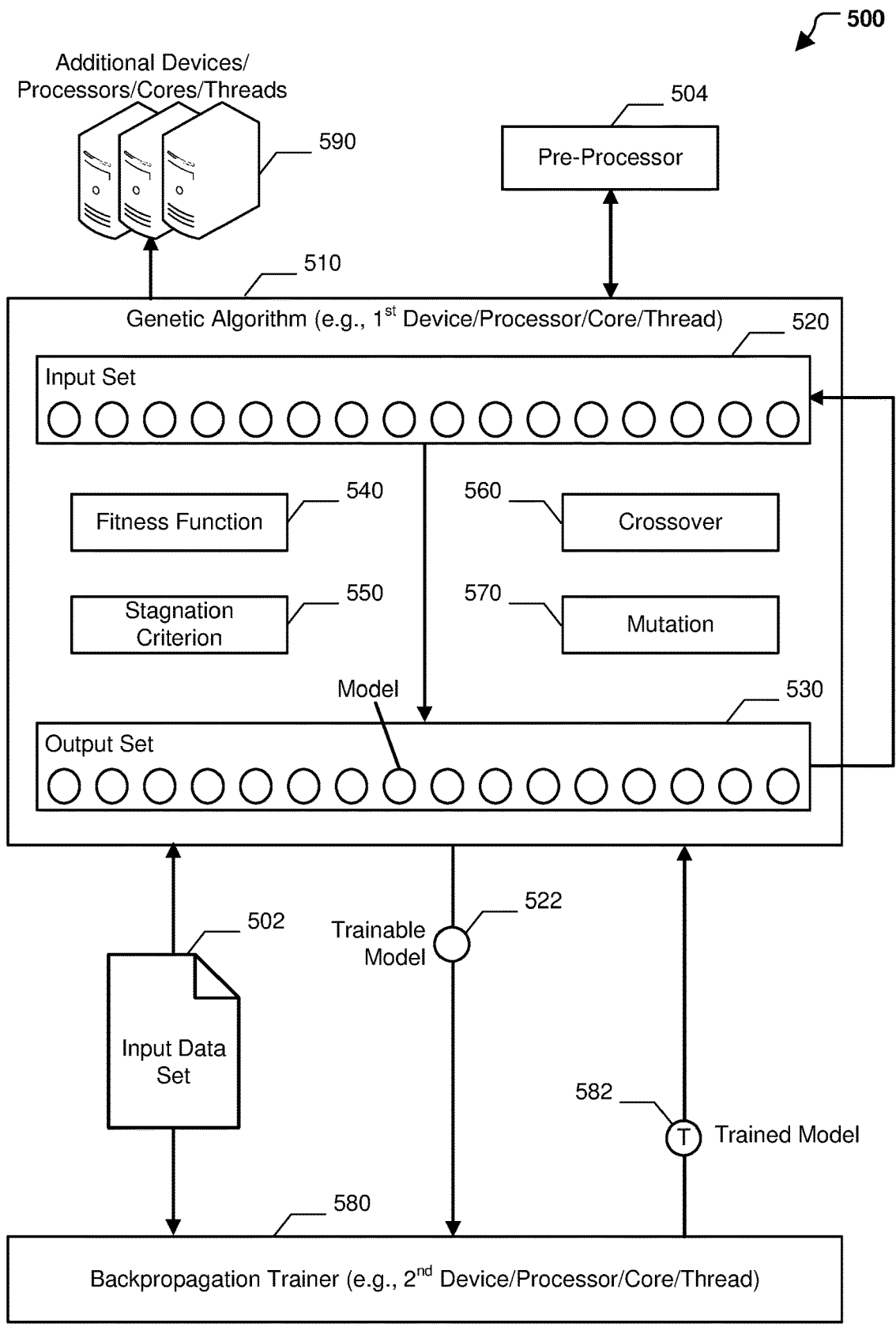
FIG. 5 illustrates a particular example of a system that is operable to support cooperative execution of a genetic algorithm and a backpropagation trainer for use in developing models to support application of artificial intelligence principles to battery technology.

In particular aspects, the genetic algorithm 510 is executed on a different device, processor (e.g., central processor unit (CPU), graphics processing unit (GPU) or other type of processor), processor core, and/or thread (e.g., hardware or software thread) than the backpropagation trainer 580. The genetic algorithm 510 and the backpropagation trainer 580 may cooperate to automatically generate a neural network model of a particular data set, such as an illustrative input data set 502. In particular aspects, the system 500 includes a pre-processor 504 that is communicatively coupled to the genetic algorithm 510. Although FIG. 5 illustrates the pre-processor 504 as being external to the genetic algorithm 510, it is to be understood that in some examples the pre-processor may be executed on the same device, processor, core, and/or thread as the genetic algorithm 510. Moreover, although referred to herein as an "input" data set 502, the input data set 502 may not be the same as "raw" data sources provided to the pre-processor 504. Rather, the pre-processor 504 may perform various rule-based operations on such "raw" data sources to determine the input data set 502 that is operated on by the automated model building engine. For example, such rule-based operations may scale, clean, and modify the "raw" data so that the input data set 502 is compatible with and/or provides computational benefits (e.g., increased model generation speed, reduced model generation memory footprint, etc.) as compared to the "raw" data sources.

As further described herein, the system 500 may provide an automated data-driven model building process that enables even inexperienced users to quickly and easily build highly accurate models based on a specified data set. Additionally, the system 500 simplify the neural network model to avoid overfitting and to reduce computing resources required to run the model. Data sets from battery-associated sensors may include, for example, timestamped indications of battery/cell status, state of charge, charge rate, discharge rate, load characteristics (e.g., in the case of vehicles, characteristics of propulsion/braking/climate control/entertainment/safety/security systems), etc.

The genetic algorithm 510 includes or is otherwise associated with a fitness function 540, a stagnation criterion 550, a crossover operation 560, and a mutation operation 570. The genetic algorithm 510 may represent a recursive search process. Each iteration of the search process (also called an epoch or generation of the genetic algorithm) may have an input set (or population) 520 and an output set (or population) 530. The input set 520 of an initial epoch of the genetic algorithm 510 may be randomly or pseudo-randomly generated. After that, the output set 530 of one epoch may be the input set 520 of the next (non-initial) epoch, as further described herein.

The input set 520 and the output set 530 may each include a plurality of models, where each model includes, for example, data representative of a neural network. For example, each model may specify a neural network by at least a neural network topology, a series of activation functions, and connection weights. The topology of a neural network may include a configuration of nodes of the neural network and connections between such nodes. The models may also be specified to include other parameters, including but not limited to bias values/functions and aggregation functions.

Figure 6:
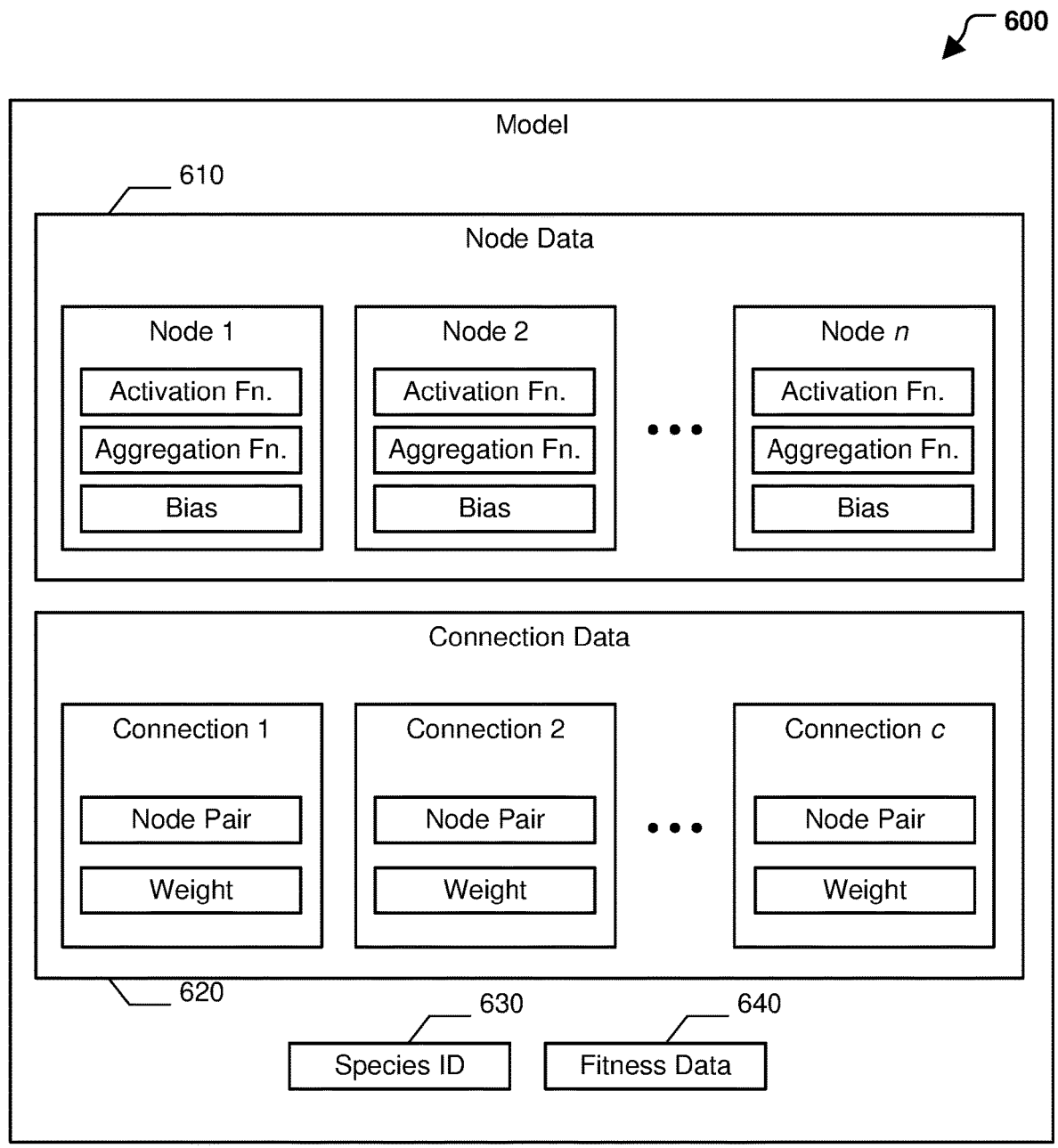
FIG. 6 illustrates a particular example of a model developed by the system of FIG. 5.

Additional examples of neural network models are further described with reference to FIG. 6. In particular, as shown in FIG. 6, a model 600 may be a data structure that includes node data 610 and connection data 620. In the illustrated example, the node data 610 for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or other type of mathematical function that represents a threshold at which the node is activated. The biological analog to activation of a node is the firing of a neuron. The aggregation function may be a mathematical function that combines (e.g., sum, product, etc.) input signals to the node. An output of the aggregation function may be used as input to the activation function. The bias may be a constant value or function that is used by the aggregation function and/or the activation function to make the node more or less likely to be activated.

The connection data 620 for each connection in a neural network may include at least one of a node pair or a connection weight. For example, if a neural network includes a connection from node N1 to node N2, then the connection data 620 for that connection may include the node pair <N1, N2>. The connection weight may be a numerical quantity that influences if and/or how the output of N1 is modified before being input at N2. In the example of a recurrent network, a node may have a connection to itself (e.g., the connection data 620 may include the node pair <N1, N1>).

The model 600 may also include a species identifier (ID) 630 and fitness data 640. The species ID 630 may indicate which of a plurality of species the model 600 is classified in, as further described with reference to FIG. 7. The fitness data 640 may indicate how well the model 600 models the input data set 502. For example, the fitness data 640 may include a fitness value that is determined based on evaluating the fitness function 540 with respect to the model 600, as further described herein.

Returning to FIG. 5, the fitness function 540 may be an objective function that can be used to compare the models of the input set 520. In some examples, the fitness function 540 is based on a frequency and/or magnitude of errors produced by testing a model on the input data set 502. As a simple example, assume the input data set 502 includes ten rows, that the input data set 502 includes two columns denoted A and B, and that the models illustrated in FIG. 5 represent neural networks that output a predicted value of B given an input value of A. In this example, testing a model may include inputting each of the ten values of A from the input data set 502, comparing the predicted values of B to the corresponding actual values of B from the input data set 502, and determining if and/or by how much the two predicted and actual values of B differ. To illustrate, if a particular neural network correctly predicted the value of B for nine of the ten rows, then the a relatively simple fitness function 540 may assign the corresponding model a fitness value of $9/10=0.9$. It is to be understood that the previous example is for illustration only and is not to be considered limiting. In some aspects, the fitness function 540 may be based on factors unrelated to error frequency or error rate, such as number of input nodes, node layers, hidden layers, connections, computational complexity, etc.

In a particular aspect, fitness evaluation of models may be performed in parallel. To illustrate, the system 500 may include additional devices, processors, cores, and/or threads 590 to those that execute the genetic algorithm 510 and the backpropagation trainer 580. These additional devices, processors, cores, and/or threads 590 may test model fitness in parallel based on the input data set 502 and may provide the resulting fitness values to the genetic algorithm 510.

In a particular aspect, the genetic algorithm 510 may be configured to perform speciation. For example, the genetic algorithm 510 may be configured to cluster the models of the input set 520 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 510 may be configured to serialize a model into a bit string. In this example, the genetic distance between models may be represented by the number of differing bits in the bit strings corresponding to the models. The bit strings corresponding to models may be referred to as "encodings" of the models. Speciation is further described with reference to FIG. 7.

Because the genetic algorithm 510 is configured to mimic biological evolution and principles of natural selection, it may be possible for a species of models to become "extinct." The stagnation criterion 550 may be used to determine when a species should become extinct, e.g., when the models in the species are to be removed from the genetic algorithm 510. Stagnation is further described with reference to FIG. 8.

The crossover operation 560 and the mutation operation 570 are highly stochastic under certain constraints and a defined set of probabilities optimized for model building, which produce reproduction operations that can be used to generate the output set 530, or at least a portion thereof, from the input set 520. In a particular aspect, the genetic algorithm 510 utilizes intra-species reproduction but not inter-species reproduction in generating the output set 530. Including intra-species reproduction and excluding inter-species reproduction may be based on the assumption that because they share more genetic traits, the models of a species are more likely to cooperate and will therefore more quickly converge on a sufficiently accurate neural network. In some examples, inter-species reproduction may be used in addition to or instead of intra-species reproduction to generate the output set 530. Crossover and mutation are further described with reference to FIG. 10.

Left alone and given time to execute enough epochs, the genetic algorithm 510 may be capable of generating a model (and by extension, a neural network) that meets desired accuracy requirements. However, because genetic algorithms utilize randomized selection, it may be overly timeconsuming for a genetic algorithm to arrive at an acceptable neural network. In accordance with the present disclosure, to "help" the genetic algorithm 510 arrive at a solution faster, a model may occasionally be sent from the genetic algorithm 510 to the backpropagation trainer 580 for training. This model is referred to herein as a trainable model 522. In particular, the trainable model 522 may be based on crossing over and/or mutating the fittest models of the input set 520, as further described with reference to FIG. 10. Thus, the trainable model 522 may not merely be a genetically "trained" file produced by the genetic algorithm 510. Rather, the trainable model 522 may represent an advancement with respect to the fittest models of the input set 520.

The backpropagation trainer 580 may utilize a portion, but not all of the input data set 502 to train the connection weights of the trainable model 522, thereby generating a trained model 582. For example, the portion of the input data set 502 may be input into the trainable model 522, which may in turn generate output data. The input data set 502 and the output data may be used to determine an error value, and the error value may be used to modify connection weights of the model, such as by using gradient descent or another function.

The backpropagation trainer 580 may train using a portion rather than all of the input data set 502 to mitigate overfit concerns and/or to shorten training time. The backpropagation trainer 580 may leave aspects of the trainable model 522 other than connection weights (e.g., neural network topology, activation functions, etc.) unchanged. Backpropagating a portion of the input data set 502 through the trainable model 522 may serve to positively reinforce "genetic traits" of the fittest models in the input set 520 that were used to generate the trainable model 522. Because the backpropagation trainer 580 may be executed on a different device, processor, core, and/or thread than the genetic algorithm 510, the genetic algorithm 510 may continue executing additional epoch(s) while the connection weights of the trainable model 522 are being trained. When training is complete, the trained model 582 may be input back into (a subsequent epoch of) the genetic algorithm 510, so that the positively reinforced "genetic traits" of the trained model 582 are available to be inherited by other models in the genetic algorithm 510.

Operation of the system 500 is now described with reference to FIGS. 7-11. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user or configuration file may specify data sources from which the pre-processor 504 is to determine the input data set 502. The user or configuration file may also specify a particular data field or a set of data fields in the input data set 502 to be modeled. The pre-processor 504 may determine the input data set 502, determine a machine learning problem type to be solved, and initialize the AMB engine (e.g., the genetic algorithm 510 and/or the backpropagation trainer 580) based on the input data set 502 and the machine learning problem type. As an illustrative non-limiting example, the pre-processor 504 may determine that the data field(s) to be modeled corresponds to output nodes of a neural network that is to be generated by the system 500. For example, if a user or configuration file indicates that the value of a particular data field is to be modeled (e.g., to predict the value based on other data of the data set), the model may be generated by the system 500 to include an output node that generates an output value corresponding to a modeled value of the particular data field. In particular implementations, the user or configuration file can also configure other aspects of the model. For example, the user or configuration file may provide input to indicate a particular data field of the data set that is to be included in the model or a particular data field of the data set that is to be omitted from the model. As another example, the user or configuration file may provide input to constrain allowed model topologies. To illustrate, the model may be constrained to include no more than a specified number of input nodes, no more than a specified number of hidden layers, or no recurrent loops.

Further, in particular implementations, a user can configure aspects of the genetic algorithm 510, such as via input to the pre-processor 504 or graphical user interfaces (GUIs) generated by the pre-processor 504, or such aspects may be configured via a configuration file. The user may provide input to limit a number of epochs that will be executed by the genetic algorithm 510. Alternatively, the user may specify a time limit indicating an amount of time that the genetic algorithm 510 has to generate a "final" model, and the genetic algorithm 510 may determine a number of epochs that will be executed based on the specified time limit. To illustrate, an initial epoch of the genetic algorithm 510 may be timed (e.g., using a hardware or software timer at the computing device executing the genetic algorithm 510), and a total number of epochs that are to be executed within the specified time limit may be determined accordingly. As another example, the user may constrain a number of models evaluated in each epoch, for example by constraining the size of the input set 520 and/or the output set 530. As yet another example, the user can define a number of trainable models 522 to be trained by the backpropagation trainer 580 and fed back into the genetic algorithm 510 as trained models 582.

In particular aspects, configuration of the genetic algorithm 510 by the pre-processor 504 includes performing other pre-processing steps. For example, the pre-processor 504 may determine whether a neural network is to be generated for a regression problem, a classification problem, a reinforcement learning problem, etc. As another example, the input data set 502 may be "cleaned" to remove obvious errors, fill in data "blanks," etc. in the data source(s) from which the input data set 502 is generated. As another example, values in the input data set 502 may be scaled (e.g., to values between 0 and 1) relative to values in the data source(s). As yet another example, non-numerical data (e.g., categorical classification data or Boolean data) in the data source(s) may be converted into numerical data or some other form of data that is compatible for ingestion and processing by a neural network. Thus, the pre-processor 504 may serve as a "front end" that enables the same AMB engine to be driven by input data sources for multiple types of computing problems, including but not limited to classification problems, regression problems, and reinforcement learning problems.

During automated model building, the genetic algorithm 510 may automatically generate an initial set of models based on the input data set 502, received input indicating (or usable to determine) the type of problem to be solved, etc. (e.g., the initial set of models is data-driven). As illustrated in FIG. 6, each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes.

The initial set of models may be input into an initial epoch of the genetic algorithm 510 as the input set 520, and at the end of the initial epoch, the output set 530 generated during the initial epoch may become the input set 520 of the next epoch of the genetic algorithm 510. In some examples, the input set 520 may have a specific number of models. For example, as shown in a first stage 700 of operation in FIG. 7, the input set may include 200 models. It is to be understood that alternative examples may include a different number of models in the input set 520 and/or the output set 530.

For the initial epoch of the genetic algorithm 510, the topologies of the models in the input set 520 may be randomly or pseudo-randomly generated within constraints specified by any previously input configuration settings. Accordingly, the input set 520 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model of epoch may have a second topology, including a second number of input nodes associated with a second set of data parameters, a second number of hidden layers including a second number and arrangement of hidden nodes, one or more output nodes, and a second set of interconnections between the nodes. Since the first model and the second model are both attempting to model the same data field(s), the first and second models have the same output nodes.

The genetic algorithm 510 may automatically assign an activation function, an aggregation function, a bias, connection weights, etc. to each model of the input set 520 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node the particular model. Aggregation functions may similarly be randomly or pseudo-randomly assigned for the models in the input set 520 of the initial epoch. Thus, the models of the input set 520 of the initial epoch may have different topologies (which may include different input nodes corresponding to different input data fields if the data set includes many data fields) and different connection weights. Further, the models of the input set 520 of the initial epoch may include nodes having different activation functions, aggregation functions, and/or bias values/functions.

Continuing to a second stage 750 of operation, each model of the input set 520 may be tested based on the input data set 502 to determine model fitness. For example, the input data set 502 may be provided as input data to each model, which processes the input data set (according to the network topology, connection weights, activation function, etc., of the respective model) to generate output data. The output data of each model may be evaluated using the fitness function 540 to determine how well the model modeled the input data set 502. For example, in the case of a regression problem, the output data may be evaluated by comparing a prediction value in the output data to an actual value in the input data set 502. As another example, in the case of a classification problem, a classifier result indicated by the output data may be compared to a classification associated with the input data set 502 to determine if the classifier result matches the classification in the input data set 502. As yet another example, in the case of a reinforcement learning problem, a reward may be determined (e.g., calculated) based on evaluation of an environment, which may include one or more variables, functions, etc. In a reinforcement learning problem, the fitness function 540 may be the same as or may be based on the reward function(s). Fitness of a model may be evaluated based on performance (e.g., accuracy) of the model, complexity (or sparsity) of the model, or a combination thereof. As a simple example, in the case of a regression problem or reinforcement learning problem, a fitness value may be assigned to a particular model based on an error value associated with the output data of that model or based on the value of the reward function, respectively. As another example, in the case of a classification problem, the fitness value may be assigned based on whether a classification determined by a particular model is a correct classification, or how many correct or incorrect classifications were determined by the model.

In a more complex example, the fitness value may be assigned to a particular model based on both prediction/classification accuracy or reward optimization as well as complexity (or sparsity) of the model. As an illustrative example, a first model may model the data set well (e.g., may generate output data or an output classification with a relatively small error, or may generate a large positive reward function value) using five input nodes (corresponding to five input data fields), whereas a second potential model may also model the data set well using two input nodes (corresponding to two input data fields). In this illustrative example, the second model may be sparser (depending on the configuration of hidden nodes of each network model) and therefore may be assigned a higher fitness value than the first model.

Figure 7:
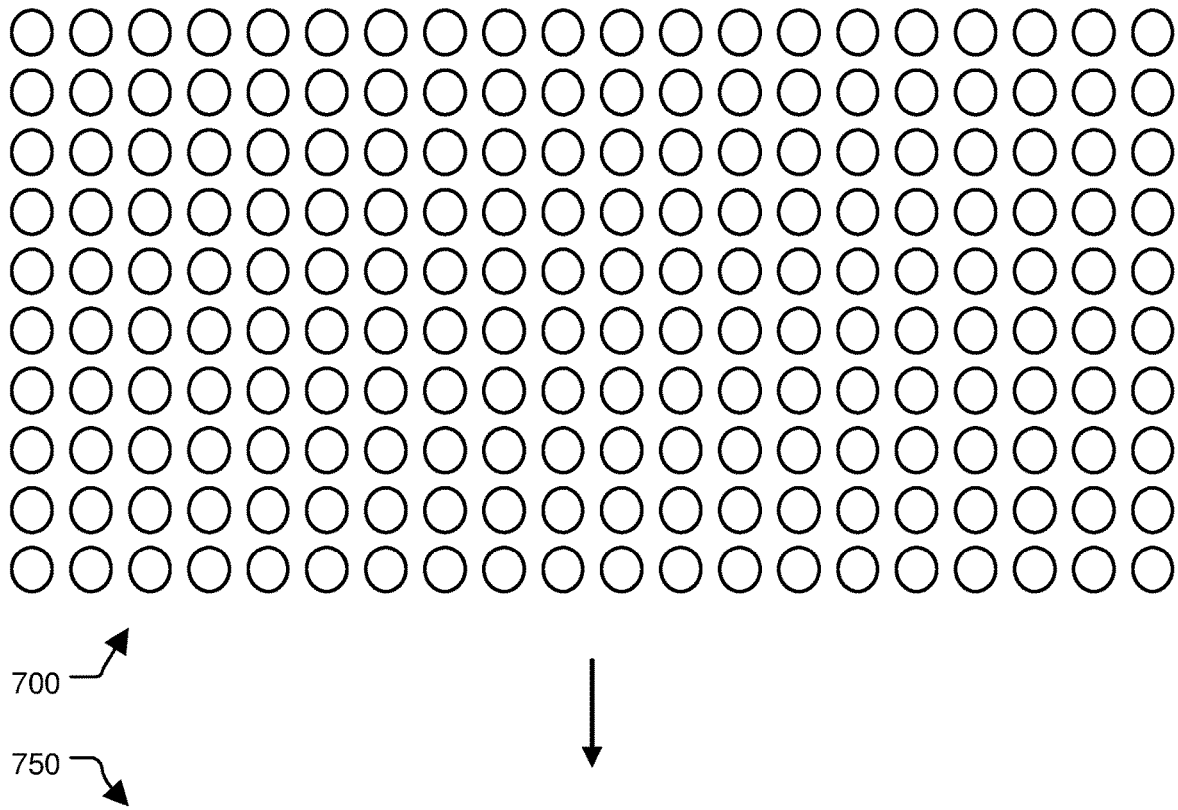
FIG. 7 illustrates particular examples of first and second stages of operation at the system of FIG. 5.
Figure 7:
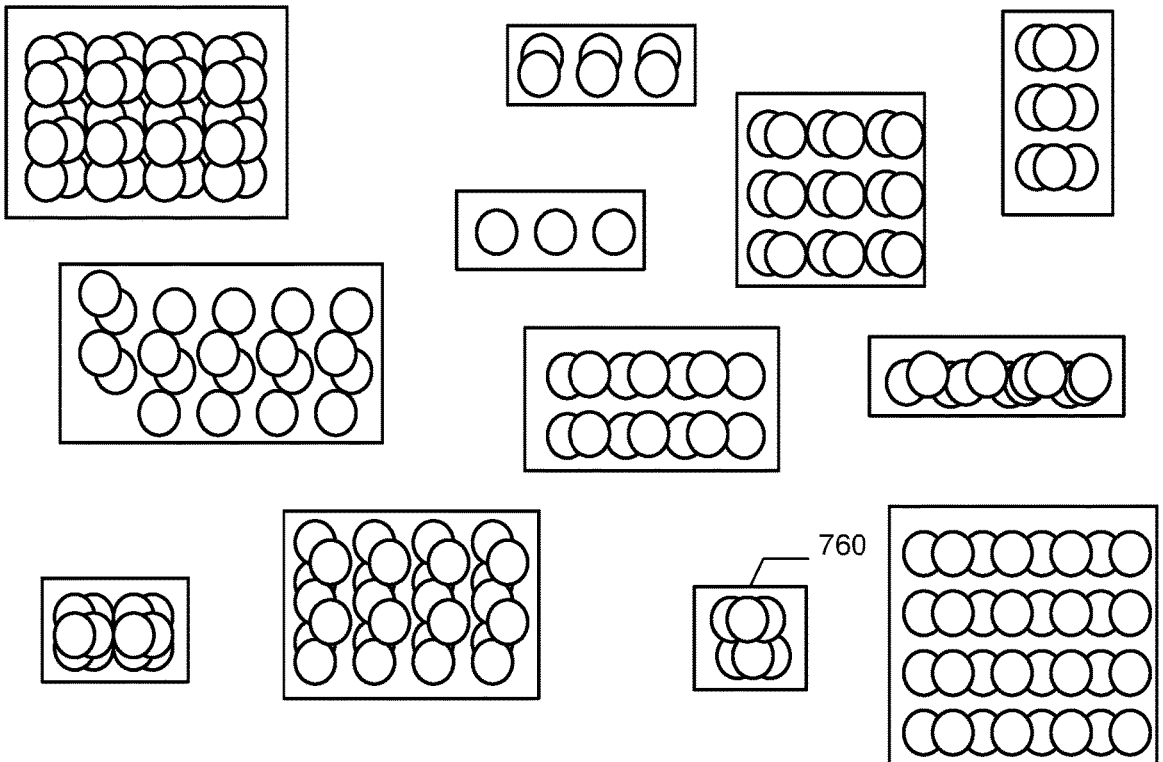

As shown in FIG. 7, the second stage 750 may include clustering the models into species based on genetic distance. In a particular aspect, the species ID 630 of each of the models may be set to a value corresponding to the species that the model has been clustered into.

Figure 8:
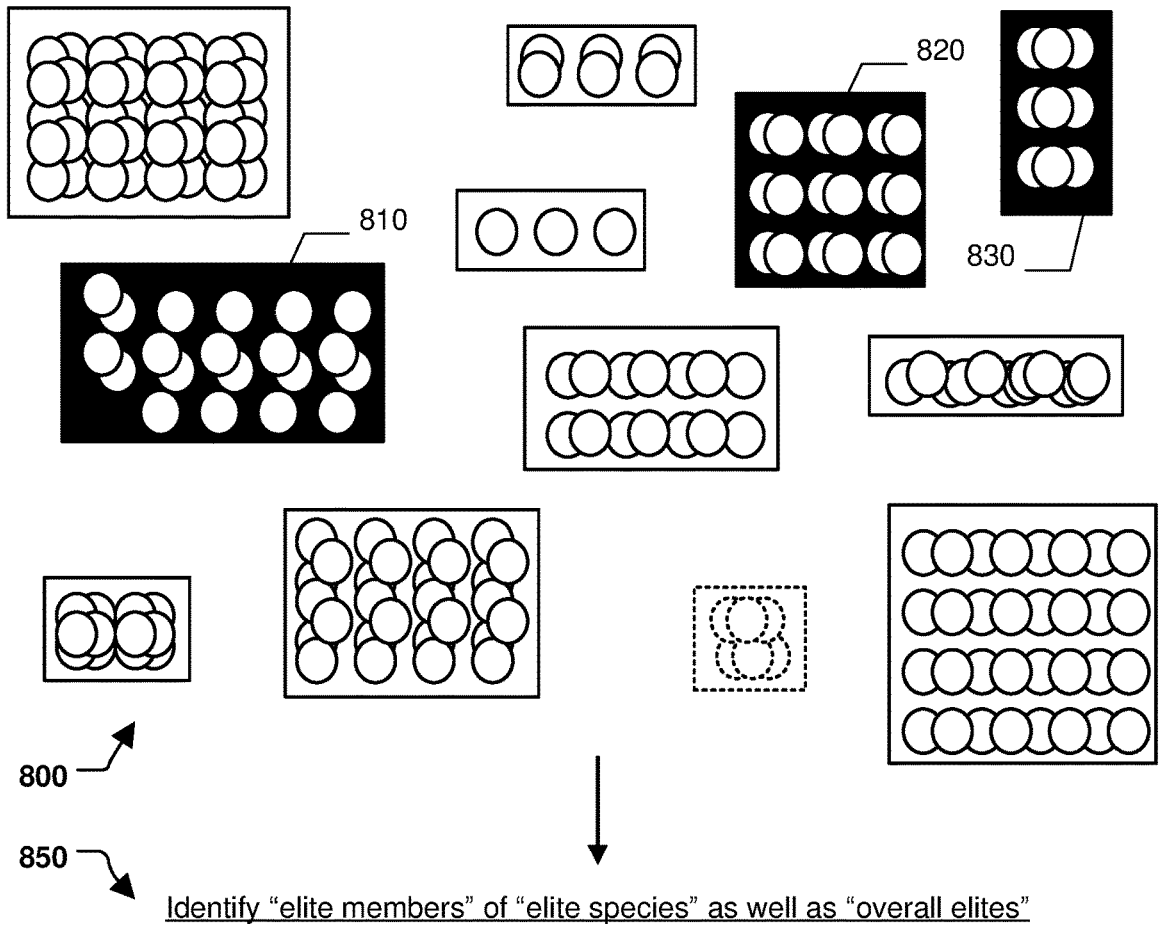
FIG. 8 illustrates particular examples of third and fourth stages of operation at the system of FIG. 5.
Figure 8:
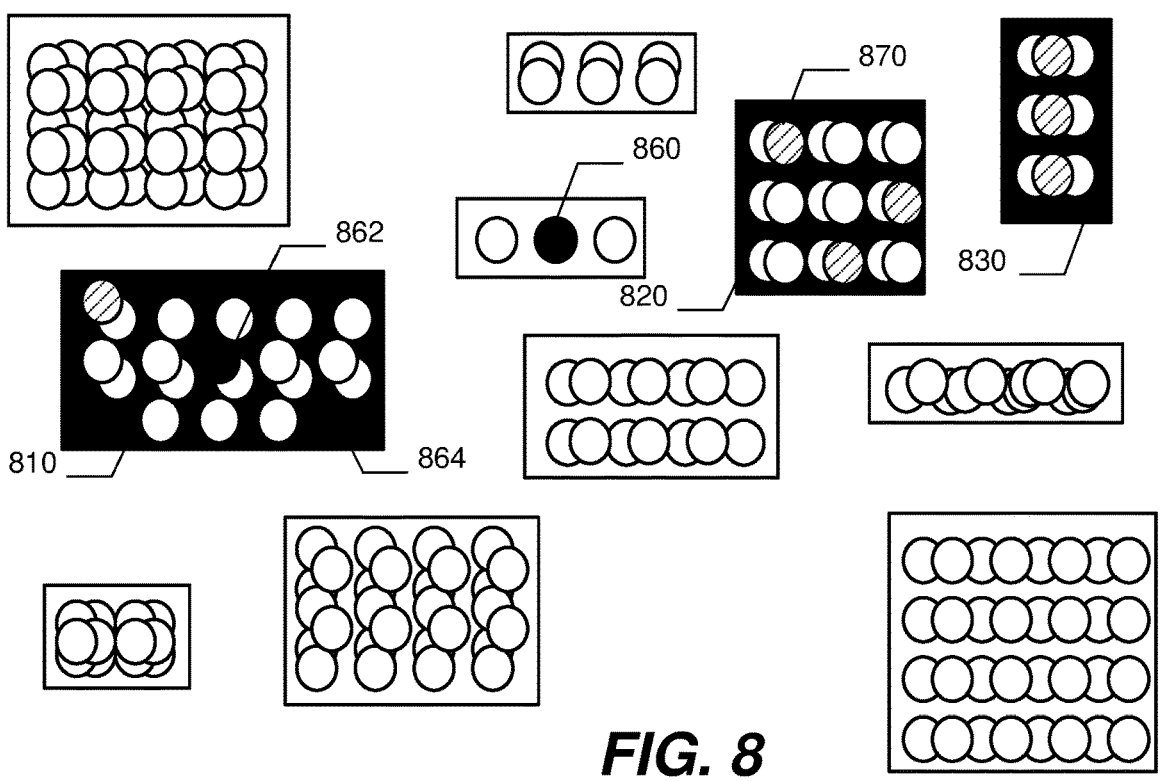

Continuing to FIG. 8, during a third stage 800 and a fourth stage 850 of operation, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 510 may maintain a data structure that tracks the fitness of each species across multiple epochs. Based on the species fitness, the genetic algorithm 510 may identify the "fittest" species, shaded and denoted in FIG. 8 as "elite species." Although three elite species 810, 820, and 830 are shown in FIG. 8, it is to be understood that in alternate examples a different number of elite species may be identified.

In a particular aspect, the genetic algorithm 510 uses species fitness to determine if a species has become stagnant and is therefore to become extinct. As an illustrative non-limiting example, the stagnation criterion 550 may indicate that a species has become stagnant if the fitness of that species remains within a particular range (e.g., +/−6%) for a particular number (e.g., 6) epochs. If a species satisfies stagnation criteria, the species and all underlying models may be removed from the genetic algorithm 510. In the illustrated example, species 760 of FIG. 7 is removed, as shown in the third stage 800 through the use of broken lines.

Proceeding to the fourth stage 850, the fittest models of each "elite species" may be identified. The fittest models overall may also be identified. In the illustrated example, the three fittest models of each "elite species" are denoted "elite members" and shown using a hatch pattern. Thus, model 870 is an "elite member" of the "elite species" 820. The three fittest models overall are denoted "overall elites" and are shown using black circles. Thus, models 860, 862, and 864 are the "overall elites" in the illustrated example. As shown in FIG. 8 with respect to the model 860, an "overall elite" need not be an "elite member," e.g., may come from a non-elite species. In an alternate implementation, a different number of "elite members" per species and/or a different number of "overall elites" may be identified.

Figure 9:
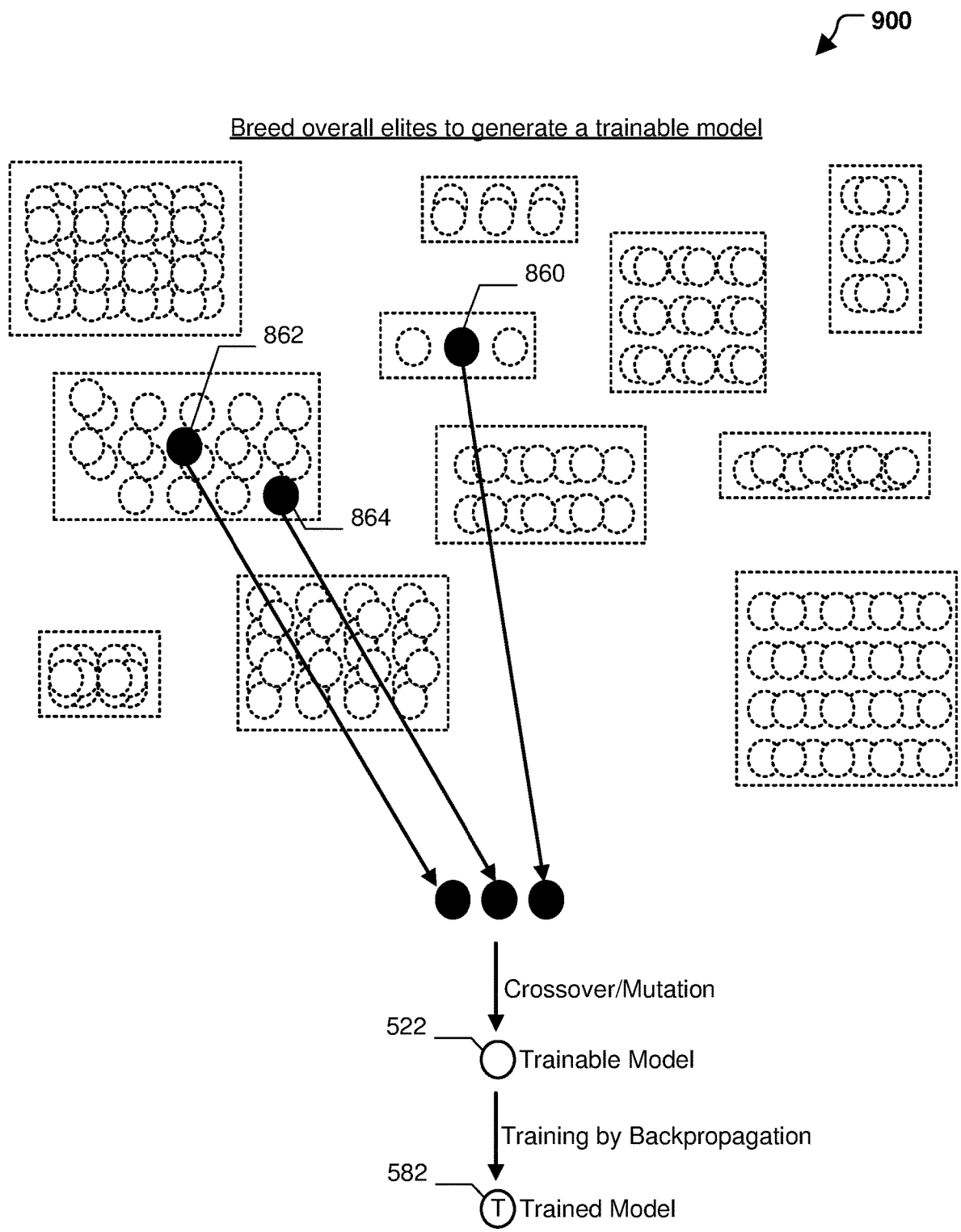
FIG. 9 illustrates a particular example of a fifth stage of operation at the system of FIG. 5.

Referring now to FIG. 9 during a fifth stage 900 of operation, the "overall elite" models 860, 862, and 864 may be genetically combined to generate the trainable model 522. For example, genetically combining models may include crossover operations in which a portion of one model is added to a portion of another model, as further illustrated in FIG. 10. As another example, a random mutation may be performed on a portion of one or more of the "overall elite" models 860, 862, 864 and/or the trainable model 522. The trainable model 522 may be sent to the backpropagation trainer 580, as described with reference to FIG. 5. The backpropagation trainer 580 may train connection weights of the trainable model 522 based on a portion of the input data set 502. When training is complete, the resulting trained model 582 may be received from the backpropagation trainer 580 and may be input into a subsequent epoch of the genetic algorithm 510.

Figure 10:
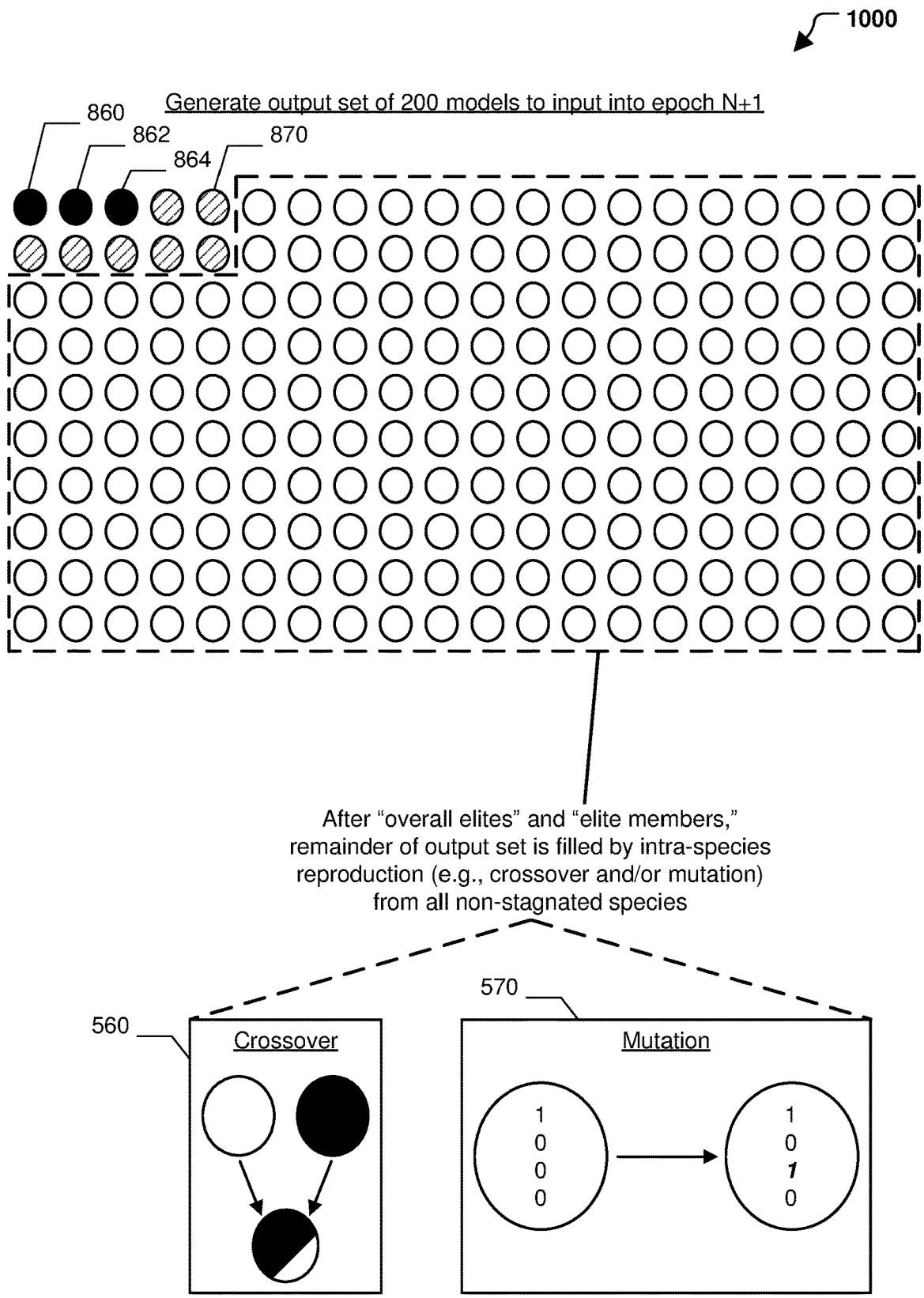
FIG. 10 illustrates a particular example of a sixth stage of operation at the system of FIG. 5.

Continuing to FIG. 10, while the backpropagation trainer 580 trains the trainable model, the output set 530 of the epoch may be generated in a sixth stage 1000 of operation. In the illustrated example, the output set 530 includes the same number of models, e.g., 200 models, as the input set 520. The output set 530 may include each of the "overall elite" models 860-864. The output set 530 may also include each of the "elite member" models, including the model 870. Propagating the "overall elite" and "elite member" models to the next epoch may preserve the "genetic traits" that resulted in such models being assigned high fitness values.

The rest of the output set 530 may be filled out by random intra-species reproduction using the crossover operation 560 and/or the mutation operation 570. In the illustrated example, the output set 530 includes 10 "overall elite" and "elite member" models, so the remaining 190 models may be randomly generated based on intra-species reproduction using the crossover operation 560 and/or the mutation operation 570. After the output set 530 is generated, the output set 530 may be provided as the input set 520 for the next epoch of the genetic algorithm 510.

During the crossover operation 560, a portion of one model may be combined with a portion of another model, where the size of the respective portions may or may not be equal. To illustrate with reference to the model "encodings" described with respect to FIG. 5, the crossover operation 560 may include concatenating bits 0 to p of one bit string with bits p+1 to q of another bit string, where p and q are integers and p+q is equal to the total size of a bit string that represents a model resulting from the crossover operation 560. When decoded, the resulting bit string after the crossover operation 560 produces a neural network that differs from each of its "parent" neural networks in terms of topology, activation function(s), aggregation function(s), bias value(s)/function(s), link weight(s), or any combination thereof.

Thus, the crossover operation 560 may be a random or pseudo-random biological operator that generates a model of the output set 530 by combining aspects of a first model of the input set 520 with aspects of one or more other models of the input set 520. For example, the crossover operation 560 may retain a topology of hidden nodes of a first model of the input set 520 but connect input nodes of a second model of the input set to the hidden nodes. As another example, the crossover operation 560 may retain the topology of the first model of the input set 520 but use one or more activation functions of the second model of the input set 520. In some aspects, rather than operating on models of the input set 520, the crossover operation 560 may be performed on a model (or models) generated by mutation of one or more models of the input set 520. For example, the mutation operation 570 may be performed on a first model of the input set 520 to generate an intermediate model and the crossover operation 560 may be performed to combine aspects of the intermediate model with aspects of a second model of the input set 520 to generate a model of the output set 530.

During the mutation operation 570, a portion of a model may be randomly modified. The frequency of mutations may be based on a mutation probability metric, which may be user-defined or randomly selected/adjusted. To illustrate with reference to the model "encodings" described with respect to FIG. 5, the mutation operation 570 may include randomly "flipping" one or more bits a bit string.

The mutation operation 570 may thus be a random or pseudo-random biological operator that generates or contributes to a model of the output set 530 by mutating any aspect of a model of the input set 520. For example, the mutation operation 570 may cause the topology a particular model of the input set to be modified by addition or omission of one or more input nodes, by addition or omission of one or more connections, by addition or omission of one or more hidden nodes, or a combination thereof. As another example, the mutation operation 570 may cause one or more activation functions, aggregation functions, bias values/functions, and/or or connection weights to be modified. In some aspects, rather than operating on a model of the input set, the mutation operation 570 may be performed on a model generated by the crossover operation 560. For example, the crossover operation 560 may combine aspects of two models of the input set 520 to generate an intermediate model and the mutation operation 570 may be performed on the intermediate model to generate a model of the output set 530.

The genetic algorithm 510 may continue in the manner described above through multiple epochs. When the genetic algorithm 510 receives the trained model 582, the trained model 582 may be provided as part of the input set 520 of the next epoch, as shown in a seventh stage 1100 of FIG. 11. For example, the trained model 582 may replace one of the other 200 models in the input set 520 or may be a 201st model of the input set (e.g., in some epochs, more than 200 models may be processed). During training by the backpropagation trainer 580, the genetic algorithm 510 may have advanced one or more epochs. Thus, when the trained model 582 is received, the trained model 582 may be inserted as input into an epoch subsequent to the epoch during which the corresponding trainable model 522 was provided to the backpropagation trainer 580. To illustrate, if the trainable model 522 was provided to the backpropagation trainer 580 during epoch N, then the trained model 582 may be input into epoch N+X, where X is an integer greater than zero.

Figure 11:
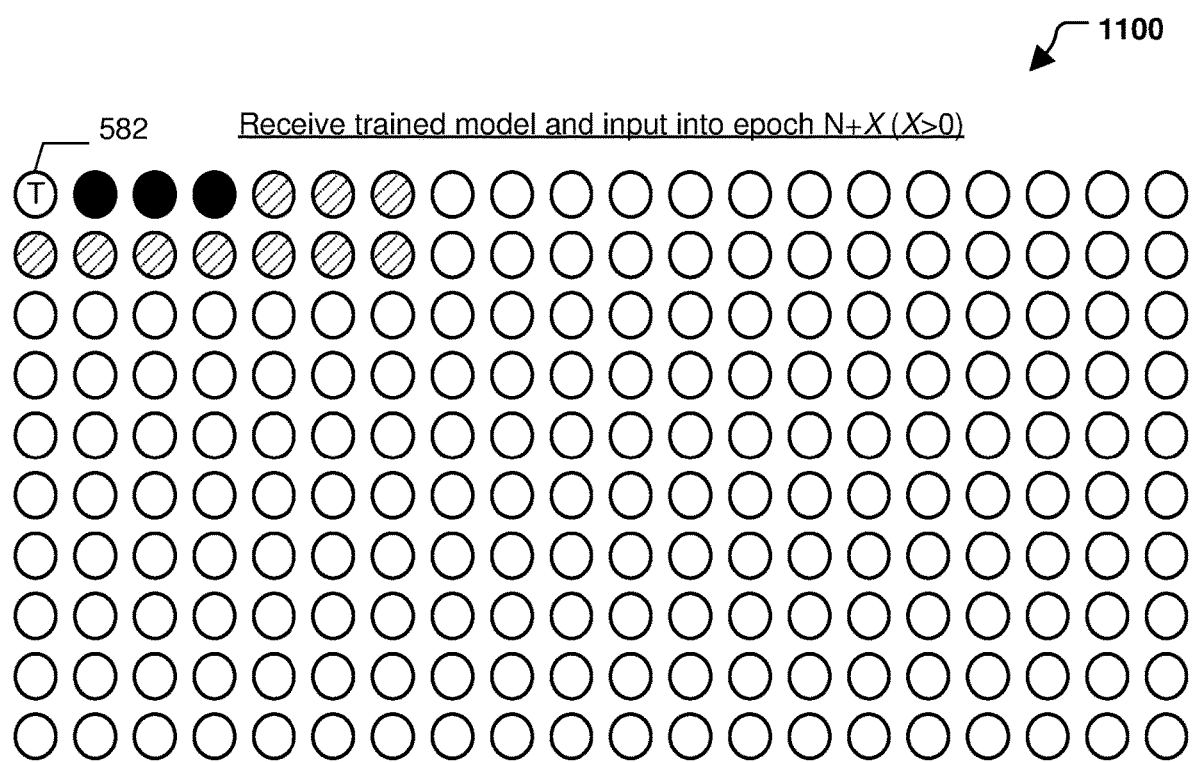
FIG. 11 illustrates a particular example of a seventh stage of operation at the system of FIG. 5.

In the example of FIGS. 5 and 11, a single trainable model 522 is provided to the backpropagation trainer 580 and a single trained model 582 is received from the backpropagation trainer 580. When the trained model 582 is received, the backpropagation trainer 580 becomes available to train another trainable model. Thus, because training takes more than one epoch, trained models 582 may be input into the genetic algorithm 510 sporadically rather than every epoch after the initial epoch. In some implementations, the backpropagation trainer 580 may have a queue or stack of trainable models 522 that are awaiting training. The genetic algorithm 510 may add trainable models 522 to the queue or stack as they are generated and the backpropagation trainer 580 may remove a trainable model 522 from the queue or stack at the start of a training cycle. In some implementations, the system 500 includes multiple backpropagation trainers 580 (e.g., executing on different devices, processors, cores, or threads). Each of the backpropagation trainers 580 may be configured to simultaneously train a different trainable model 522 to generate a different trained model 582. In such examples, more than one trainable model 522 may be generated during an epoch and/or more than one trained model 582 may be input into an epoch.

Operation at the system 500 may continue iteratively until specified a termination criterion, such as a time limit, a number of epochs, or a threshold fitness value (of an overall fittest model) is satisfied. When the termination criterion is satisfied, an overall fittest model of the last executed epoch may be selected and output as representing a neural network that best models the input data set 502. In some examples, the overall fittest model may undergo a final training operation (e.g., by the backpropagation trainer 580) before being output.

Although various aspects are described with reference to a backpropagation training, it is to be understood that in alternate implementations different types of training may also be used in the system 500. For example, models may be trained using a genetic algorithm training process. In this example, genetic operations similar to those described above are performed while all aspects of a model, except for the connection weight, are held constant.

Performing genetic operations may be less resource intensive than evaluating fitness of models and training of models using backpropagation. For example, both evaluating the fitness of a model and training a model include providing the input data set 502, or at least a portion thereof, to the model, calculating results of nodes and connections of a neural network to generate output data, and comparing the output data to the input data set 502 to determine the presence and/or magnitude of an error. In contrast, genetic operations do not operate on the input data set 502, but rather merely modify characteristics of one or more models. However, as described above, one iteration of the genetic algorithm 510 may include both genetic operations and evaluating the fitness of every model and species. Training trainable models generated by breeding the fittest models of an epoch may improve fitness of the trained models without requiring training of every model of an epoch. Further, the fitness of models of subsequent epochs may benefit from the improved fitness of the trained models due to genetic operations based on the trained models. Accordingly, training the fittest models enables generating a model with a particular error rate in fewer epochs than using genetic operations alone. As a result, fewer processing resources may be utilized in building highly accurate models based on a specified input data set 502.

The system 500 of FIG. 5 may thus support cooperative, data-driven execution of a genetic algorithm and a backpropagation trainer to automatically arrive at an output neural network model of an input data set. The system of FIG. 5 may arrive at the output neural network model faster than using a genetic algorithm or backpropagation alone and with reduced cost as compared to hiring a data scientist. In some cases, the neural network model output by the system 500 may also be more accurate than a model that would be generated by a genetic algorithm or backpropagation alone. The system 500 may also provide a problem-agnostic ability to generate neural networks. For example, the system 500 may represent a single automated model building framework that is capable of generating neural networks for at least regression problems, classification problems, and reinforcement learning problems. Further, the system 500 may enable generation of a generalized neural network that demonstrates improved adaptability to never-before-seen conditions. To illustrate, the neural network may mitigate or avoid overfitting to an input data set and instead may be more universal in nature. Thus, the neural networks generated by the system 500 may be capable of being deployed with fewer concerns about generating incorrect predictions.

Figure 12:
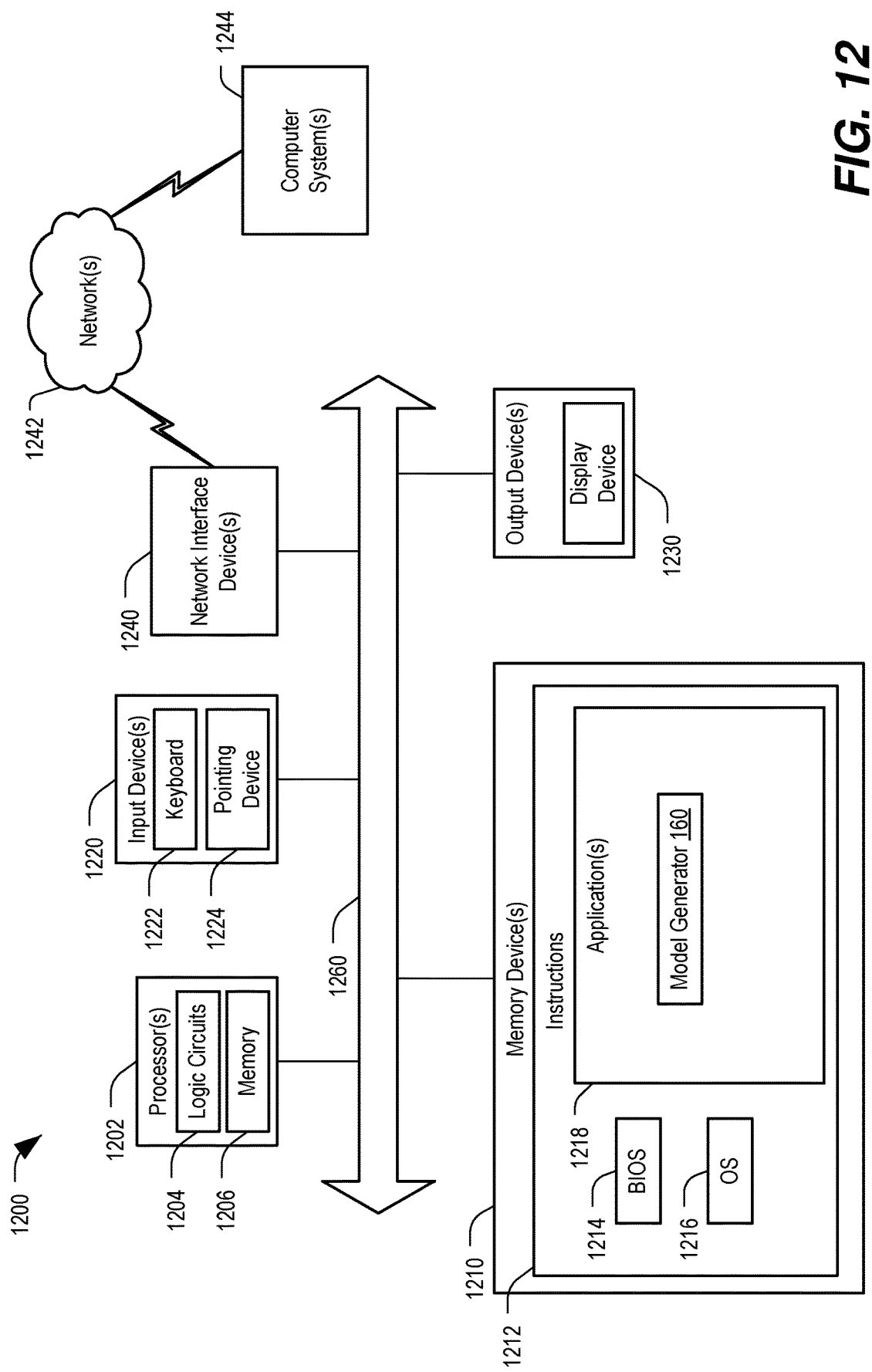
FIG. 12 is a block diagram of a computer system configured to initiate, perform, or control one or more of the operations described with reference to FIGS. 1-11.

FIG. 12 is a block diagram of a particular computer system 1200 configured to initiate, perform, or control one or more of the operations described with reference to FIGS. 1-11. For example, the computer system 1200 may include, or be included within, one or more of the devices, wide area wireless networks, or servers described with reference to FIGS. 1-11. The computer system 1200 can also be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. In some examples, the computer system 1200, or at least components thereof, are included in a device that is associated with a battery or a cell, such as a vehicle, a device associated with a battery-based electrical grid, etc. Further, while a single computer system 1200 is illustrated, the term "system" includes any collection of systems or sub-systems that individually or jointly execute a set, or multiple sets, of instructions to perform one or more computer functions.

While FIG. 12 illustrates one example of the particular computer system 1200, other computer systems or computing architectures and configurations may be used for carrying out the operations disclosed herein. The computer system 1200 includes one or more processors 1202. Each processor of the one or more processors 1202 can include a single processing core or multiple processing cores that operate sequentially, in parallel, or sequentially at times and in parallel at other times. Each processor of the one or more processors 1202 includes circuitry defining a plurality of logic circuits 1204, working memory 1206 (e.g., registers and cache memory), communication circuits, etc., which together enable the processor to control the operations performed by the computer system 1200 and enable the processor to generate a useful result based on analysis of particular data and execution of specific instructions.

The processor(s) 1202 are configured to interact with other components or subsystems of the computer system 1200 via a bus 1260. The bus 1260 is illustrative of any interconnection scheme serving to link the subsystems of the computer system 1200, external subsystems or device, or any combination thereof. The bus 1260 includes a plurality of conductors to facilitate communication of electrical and/or electromagnetic signals between the components or subsystems of the computer system 1200. Additionally, the bus 1260 includes one or more bus controller or other circuits (e.g., transmitters and receivers) that manage signaling via the plurality of conductors and that cause signals sent the plurality of conductors to conform to particular communication protocols.

The computer system 1200 also includes one or more memory devices 1210. The memory devices 1210 include any suitable computer-readable storage device depending on, for example, whether data access needs to be bi-directional or unidirectional, speed of data access required, memory capacity required, other factors related to data access, or any combination thereof. Generally, the memory devices 1210 include some combination of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory devices 1210 include circuit and structures and are not merely signals or other transitory phenomena.

The memory device(s) 1210 store instructions 1212 that are executable by the processor(s) 1202 to perform various operations and functions. The instructions 1212 include instructions to enable the various components and subsystems of the computer system 1200 to operate, interact with one another, and interact with a user, such as an input/output system (BIOS) 1214 and an operating system (OS) 1216. Additionally, the instructions 1212 include one or more applications 1218, scripts, or other program code to enable the processor(s) 1202 to perform the operations described herein. For example, the instructions 1212 can include the model generator 160 of FIG. 1.

In FIG. 12, the computer system 1200 also includes one or more output devices 1230, one or more input devices 1220, and one or more network interface devices 1240. Each of the output device(s) 1230, the input device(s) 1220, and the network interface device(s) 1240 can be coupled to the bus 1260 via an a port or connector, such as a Universal Serial Bus port, a digital visual interface (DVI) port, a serial ATA (SATA) port, a small computer system interface (SCSI) port, a high-definition media interface (HMDI) port, or another serial or parallel port. In some implementations, one or more of the output device(s) 1230, the input device(s) 1220, the network interface device(s) 1240 is coupled to or integrated within a housing with the processor(s) 1202 and the memory devices 1210, in which case the connections to the bus 1260 can be internal, such as via an expansion slot or other card-to-card connector. In other implementations, the processor(s) 1202 and the memory devices 1210 are integrated within a housing that includes one or more external ports, and one or more of the output device(s) 1230, the input device(s) 1220, the network interface device(s) 1240 is coupled to the bus 1260 via the external port(s).

Examples of the output device(s) 1230 include a display device, one or more speakers, a printer, a television, a projector, or another device to provide an output of data in a manner that is perceptible by a user. Examples of the input device(s) 1220 include buttons, switches, knobs, a keyboard 1222, a pointing device 1224, a biometric device, a microphone, a motion sensor, or another device to detect user input actions. The pointing device 1224 includes, for example, one or more of a mouse, a stylus, a track ball, a pen, a touch pad, a touch screen, a tablet, another device that is useful for interacting with a graphical user interface, or any combination thereof.

The network interface device(s) 1240 is configured to enable the computer system 1200 to communicate with one or more other computer systems 1244 via a one or more networks 1242. The network interface device(s) 1240 encode data in electrical and/or electromagnetic signals that are transmitted to the other computer system(s) 1244 using pre-defined communication protocols. The electrical and/or electromagnetic signals can be transmitted wirelessly (e.g., via propagation through free space), via one or more wires, cables, optical fibers, or via a combination of wired and wireless transmission.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

It is to be understood that the division and ordering of steps described herein is for illustrative purposes only and is not to be considered limiting. In alternative implementations, certain steps may be combined and other steps may be subdivided into multiple steps. Moreover, the ordering of steps may change.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving input data associated with at least one sensor;
   executing at least one trained model by a processor, wherein executing the trained model comprises providing the input data to the at least one trained model to generate a model output; and
   determining, based on the model output, whether to initiate or terminate selectively charging a first battery cell of a battery.

2. The method of claim 1, wherein the at least one trained model corresponds to a neural network.

3. The method of claim 1, wherein the at least one sensor is coupled to the battery or within the battery.

4. The method of claim 1, wherein the at least one sensor is an environmental sensor.

5. The method of claim 1, wherein the input data corresponds to temperature data, weather data, or a combination thereof.

6. The method of claim 1, wherein the input data corresponds to geographical data.

7. The method of claim 1, wherein the battery is coupled to an electrical grid.

8. The method of claim 1, further comprising controlling, based on execution of the at least one trained model, selective charging, selective discharging, selective connection, selective disconnection, or a combination thereof for a plurality of batteries, and wherein an electrical grid comprises the plurality of batteries.

9. The method of claim 1, wherein the model output corresponds to a prediction associated with the battery.

10. The method of claim 9, wherein the prediction is associated with a future performance of the battery or the first battery cell.

11. The method of claim 10, wherein the future performance identifies a predicted failure of the battery or the first battery cell.

12. The method of claim 1, further comprising determining, based on the model output, to charge or discharge the first battery cell of the battery prior to charging or discharging a second battery cell of the battery.

13. The method of claim 1, further comprising automatically initiating or terminating charging of the first battery cell but not a second battery cell based on the model output.

14. A system comprising:
   a first battery cell of a battery;
   a first controller, wherein the first controller is connected to the first battery cell;
   at least one sensor; and
   a processor configured to receive sensor data from the at least one sensor and, based at least in part on the sensor data:
      execute at least one trained model to generate a model output; and
      output, based on the model output, a first signal to the first controller to cause the first controller to connect or disconnect a corresponding first battery cell to or from a discharge path.

15. The system of claim 14, further comprising:
a second battery cell of the battery, wherein the processor is further configured to output, based on the model output, a second signal to cause initiation or termination of charging of the second battery cell.

16. The system of claim 15, wherein the processor is further configured to output signals to cause the first battery cell and the second battery cell to be charged simultaneously.

17. The system of claim 15, wherein the model output indicates that the first battery cell has a higher predicted likelihood of failure than the second battery cell or a higher predicted likelihood of overheating than the second battery cell.

18. The system of claim 17, wherein the processor is further configured to output signals that cause the first battery cell to be electrically isolated from the second battery cell.

19. A computer-readable storage device storing instructions that, when executed by one or more processors, cause the one or more processors to perform operations comprising:
receiving input data associated with at least one sensor;
executing at least one trained model by a processor, wherein executing the trained model comprises providing the input data to the at least one trained model to generate a model output; and
determining, based on the model output, whether to initiate or terminate selectively charging a first battery cell of a battery.

20. The computer-readable storage device of claim 19, wherein the operations further comprise determining, based on the model output, to charge or discharge the first battery cell of the battery prior to charging or discharging a second cell of the battery.

* * * * *